(12) United States Patent
Nakamura et al.

(10) Patent No.: US 9,451,780 B2
(45) Date of Patent: Sep. 27, 2016

(54) STICK SUPPLYING UNIT, STICK DISCHARGING UNIT, AND SAUSAGE SUSPENDING APPARATUS

(71) Applicant: HITEC Co., Ltd., Kanagawa (JP)

(72) Inventors: Tatsuo Nakamura, Kanagawa (JP); Takayuki Fujimaki, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 14/847,642

(22) Filed: Sep. 8, 2015

(65) Prior Publication Data

US 2016/0066588 A1  Mar. 10, 2016

(30) Foreign Application Priority Data

Sep. 10, 2014 (JP) ................................ 2014-184076

(51) Int. Cl.
 *A22C 11/00* (2006.01)
 *A22C 15/00* (2006.01)

(52) U.S. Cl.
 CPC .................................. *A22C 15/002* (2013.01)

(58) Field of Classification Search
 CPC ..... A22C 11/00; A22C 11/008; A22C 11/02; A22C 15/00; A22C 15/001; A22C 15/002; A22C 15/007
 USPC ........................ 452/30–32, 35–37, 46–48, 51
 See application file for complete search history.

(56) References Cited

U.S. PATENT DOCUMENTS

| | | | | |
|---|---|---|---|---|
| 6,592,452 B1 * | 7/2003 | Myers | ................... | A22C 11/00 452/51 |
| 6,869,353 B2 * | 3/2005 | Kasai | ................... | A22C 15/001 452/186 |
| 7,588,485 B1 * | 9/2009 | Nakamura | ........... | A22C 15/001 452/51 |
| 8,113,924 B2 | 2/2012 | Nakamura et al. | | |
| 8,708,782 B2 * | 4/2014 | Kessler | ................ | A22C 15/001 452/51 |

FOREIGN PATENT DOCUMENTS

| | | |
|---|---|---|
| JP | 1988-219334 A | 9/1988 |
| JP | 1991-9661 Y2 | 3/1991 |
| JP | 2003-158991 A | 6/2003 |
| JP | 2004-152 A | 1/2004 |
| JP | 2011-45294 A | 3/2011 |

* cited by examiner

*Primary Examiner* — Richard Price, Jr.
(74) *Attorney, Agent, or Firm* — Bachman & LaPointe, P.C.

(57) ABSTRACT

A sausage suspending apparatus includes: a plurality of suspending members for suspending a sausage therefrom; a conveyor having the suspending members; and stick supporting members for supporting a stick. A stick discharging unit has a pair of stick latching arm bodies adapted to move upwardly in a forward direction, and, after the stick latching arm body has taken up the stick from the stick supporting member, the stick latching arm body discharges the stick from the stick latching arm body. The pair of stick latching arm bodies are located in correspondence with both end portions of the stick in a longitudinal direction of the stick, and a moving body and a driving body are provided outside a range between the both end portions of the stick.

9 Claims, 20 Drawing Sheets

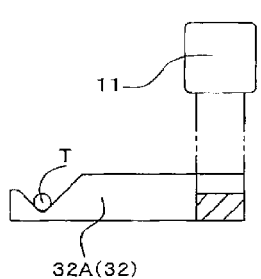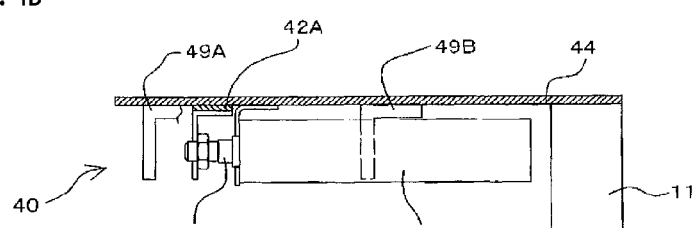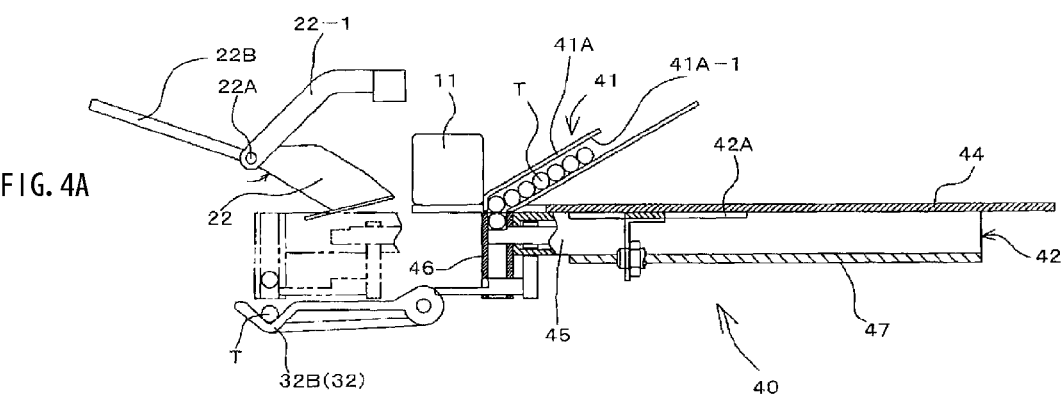
FIG. 4C
FIG. 4B
FIG. 4A

FIG. 15A
FIG. 15B
FIG. 15C
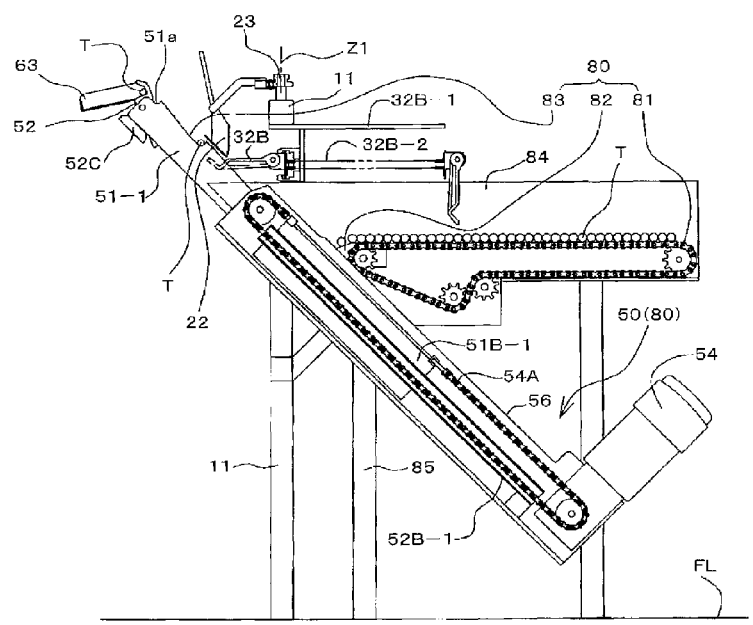
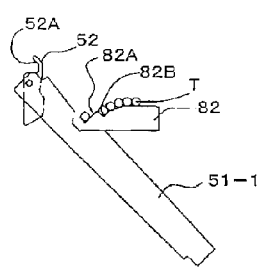
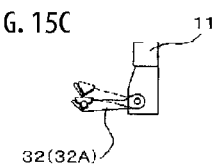

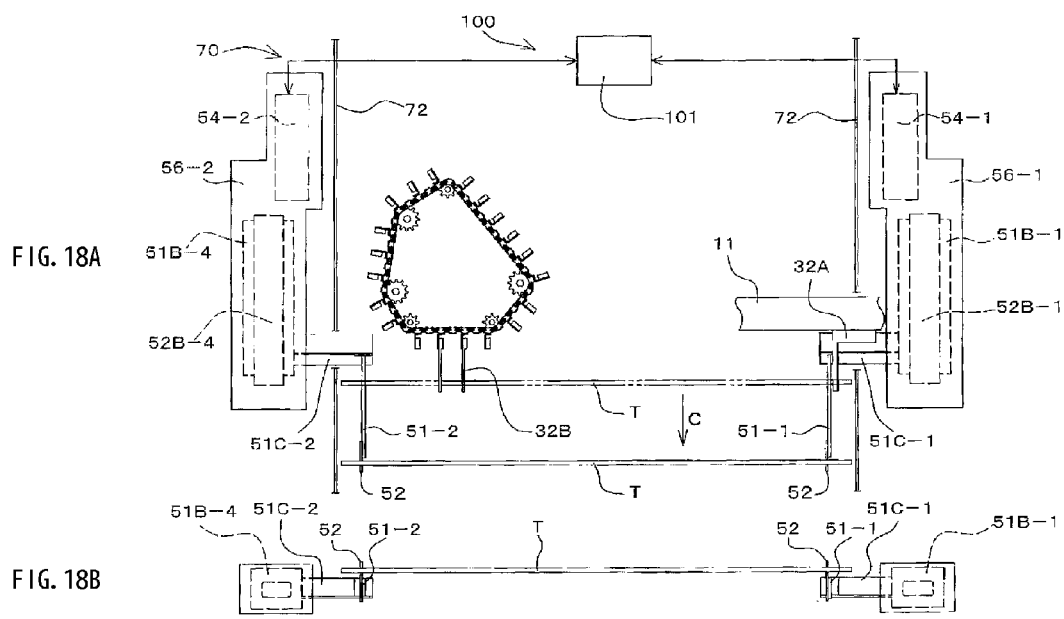

STICK SUPPLYING UNIT, STICK DISCHARGING UNIT, AND SAUSAGE SUSPENDING APPARATUS

BACKGROUND OF THE INVENTION

1. Field of the Invention

The present invention relates to a stick supplying unit, a stick discharging unit, and a sausage suspending apparatus.

2. Description of the Related Art

Conventionally, a sausage is suspended in loop form from suspending members provided on a conveyor connected to a stuffing apparatus, is subsequently delivered manually or automatically to a stick for heat treatment, and is suspended from the stick while maintaining the loop form. For example, in a conventionally known apparatus of this type, the stick is supported by hook-like portions of arm-like stick supporting members in the vicinities of both ends in the longitudinal direction of the stick. In such an apparatus, the sticks are arranged and supported one at a time on the hook-like portions of the stick supporting members by a supplying unit, and the stick is taken up from the stick supporting members by a stick discharging unit and is brought to a position where it can be taken out. In this upward movement of the stick, the sausage suspended from the suspending members is transferred onto the stick and is suspended from the stick. The stick with the sausage suspended therefrom is transferred by a transfer unit to a carrying-out conveyor headed for a smokehouse. For example, devices disclosed in the following patent documents are known: stick supplying unit: Patent Document 2, Patent Document 3, and Patent Document 5; stick discharging unit: Patent document 5; and stick transfer unit: Patent document 1 and Patent Document 4.

Concerning linked sausages which are manufactured by a stuffing apparatus, an apparatus is disclosed in Patent Document 1 in which, in order to be heat treated in a smokehouse, a stuffed sausage is directly hung in loop form on a hanging rod (stick) supported by a pair of receiving stands at a position directly above a carrying-out conveyor headed for a smokehouse. In this apparatus, a hanging means for hanging the stuffed sausage on the hanging rod is disposed in such a manner as to extend up to a region over the carrying-out conveyor, the sausage is continued to be hung on the hanging rod while being formed into loops by this hanging means, and the loops are moved on the hanging rod in the longitudinal direction of the hanging rod while the loops are being pulled away from each other by a plurality of pulling-away arms which move in the longitudinal direction of the rod. The hanging rod from which the sausage is hung is brought onto the carrying-out conveyor as the receiving stands are lowered by vertically movable cylinders.

Meanwhile, a stick supplying unit disclosed in Patent Document 2 is comprised of: suspension hooks for suspending a meat-filled sheep intestine and stick supporting hooks positioned therebelow; an inclined table on which a multiplicity of sticks are stored; and a transfer member for dropping and supplying the stick onto the stick supporting hooks by transferring the sticks one by one up to the stick supporting hooks between the suspension hooks and the stick supporting hooks which are juxtaposed in the vertical direction.

The stick supplying unit of Patent Document 3 includes a chute-like guide portion in which an inclined groove is formed for guiding the stick with respect to each of its both ends from a storage device with a plurality of sticks stored therein, as well as a slide member which, upon receiving only one stick from a lower end opening of the guide portion, moves in a horizontal direction toward a position above a hook-like portion of the aforementioned stick supporting member, wherein a groove member allowing the stick to drop is provided in a suspended manner at a distal end portion of the slide member. In addition, a rod is incorporated in the slide member and is adapted to move between a projected position at which the groove of the groove member is closed by a distal end of the rod to hamper the dropping of the stick and a retreated position at which the distal end of the rod is retreated from the groove member to allow the dropping of the stick.

In such Patent Document 3, the slide member advances upon receiving only one stick from the lower end opening of the guide portion, to thereby close the lower end opening of the guide member, and after the stick is conveyed to the position above the hook-like portion, the rod moves to its retreated position to open the groove in the groove member of the slide member, allowing the stick to pass through the groove and to be dropped onto the hook-like portion of the aforementioned stick supporting member.

In a stick supplying unit of Patent Document 5, a stick transfer body, which moved upwardly beyond a stick supporting member in a state in which the stick is held by a notched portion, is adapted to deliver the held stick onto the stick supporting member while moving downwardly from beyond the stick supporting member. In addition to the aforementioned notched portion, a notched portion is also formed separately on this stick transfer body for taking up from the stick supporting member the stick, which is set on the stick supporting member, during its upward movement beyond the stick supporting member.

With the stick discharging unit of Patent Document 5, the stick supported by a pair of stick supporting members is taken up from the stick supporting members by a pair of arm-like stick transfer bodies, and after the sausage is thereby set in a state of being suspended from the stick in loop form, the stick is discharged. The stick transfer bodies are respectively positioned in correspondence with both end portions of the stick in the longitudinal direction of the stick, and are adapted to undergo stroke movement by being driven by a pair of rodless cylinders provided for the respective stick transfer bodies in such a manner as to be located on the inner side of the stick transfer bodies in the longitudinal direction, i.e., within the lengthwise range of the stick. As for the stick transfer body, its distal end portion having the notched portion for latching and taking up the stick is movable in the longitudinal direction of the stick transfer body on a linear track extending diagonally between a standby position located below the stick supporting member and a discharge position located above the stick supporting member. According to this Patent Document 5, as the stick transfer body moves upwardly on the track, the stick transfer body lifts up and takes out the stick with the sausage loops suspended therefrom from below by the notched portion, and brings it to the discharge position.

Next, Patent document 4 is known as the stick transfer unit, and in Patent Document 4 there are provided a horizontal transfer means which transfers a stick with the sausage suspended in loop form in the longitudinal direction of the stick to a position immediately above a carrying-out conveyor means, as well as a transfer means which, upon receiving the stick from the horizontal transfer means at the position immediately above the carrying-out conveyor means, is downwardly moved and delivers the stick onto the carrying-out conveyor means.

CITATION LIST

Patent Document 1: JP-UM-B-1991-9661
Patent Document 2: JP-A-2004-152
Patent Document 3: JP-A-1988-219334
Patent Document 4: JP-A-2011-45294
Patent Document 5: JP-A-2003-158991

Normally, an operator effects end processing operation for tying a leading end portion and a trailing end portion of one sausage suspended from the stick in order to prevent the leakage of the material at the leading end portion and the trailing end portion; however, if an attempt is made to effect this end processing operation by the unit of Patent Document 1, the operator is compelled to effect the operation in an area above the carrying-out conveyor, so that it is difficult to perform the operation. In addition, in Patent Document 2, the inclined table is disposed outside the region of the endlessly circulating movement of the suspension hooks, and the transporting member transfers the stick by traversing the region of the endlessly circulating movement, so that the stick transfer distance is long; therefore, not only is time taken in the supply of sticks, but the apparatus is unavoidably made in large in size. Furthermore, with the stick supplying unit of Patent Document 3, there are problems in terms of the dropping height of the stick onto the stick supporting member and stable and smooth supply, and, with the stick transfer unit of Patent Document 4, since the stick is transferred horizontally in the longitudinal direction of the stick over a distance greater than the length of the stick, it takes time in the transfer to the carrying-out conveyor. If the horizontal transfer speed is increased, loop swing occurs in the transferring direction, making the transfer of the stick unstable. Therefore, there remain problems to be remedied with respect to the stick transfer unit of Patent Document 4 in that the transfer speed is limited, and with respect to the stick supplying unit and the stick discharging unit of Patent Document 5 in terms of at least the size of the apparatus in the direction of stroke movement of the stick transfer body.

Namely, with the stick supplying unit of Patent document 3, the stick drops at once from the heightwise position of the rod inside the slide member to the position of the hook-like portion of the stick supporting member the moment when the rod has moved to its retreated position. Because the rod is located above the groove member, the dropping distance is required for the height of the groove member, a large heightwise dimension is required, and therefore the impact at the time of dropping onto the hook-like portion is large. Consequently, this can cause the stick to spring up or causes damage to the stick and the stick supporting member.

With the stick supplying unit of Patent Document 5, in a case where the required upward moving distance of the stick transfer body for supplying the stick is longer than the required upward moving distance for discharging the stick, an unnecessary amount of movement is included for stick discharging, so that the stick supplying unit makes the stick discharging time long by that portion.

In addition, with the stick discharging unit of Patent Document 5, since the rodless cylinders are located within the lengthwise range of the stick, i.e., on the inner side of the stick transfer bodies, the rodless cylinders must be arranged at a position lower than the stick supporting members for supporting both end portions of the stick. For this reason, it is necessary to make the arranged position of the stick supporting members high, and an increase in the size of the apparatus in the heightwise direction is unavoidable. In addition, although the rodless cylinders are respectively provided for both stick transfer bodies, a means is not provided for achieving synchronization in the movement of the stick transfer bodies which are driven separately, so that it is difficult to move the stick transfer bodies at high speed.

SUMMARY OF THE INVENTION

The present invention has been devised in view of the above-described circumstances, and its object is to provide a stick supplying unit, a stick discharging unit, and a sausage suspending apparatus which enable the supplying, discharging, and conveying out of the sticks whose required stick moving distance is short, thereby making it possible to achieve a compact size of the apparatus, stabilization of stick movement, and improvement in the productivity of the apparatus (reduction of the cycle time and improvement of operational efficiency).

In accordance with the present invention, the above-described problems are overcome by the following first to sixth aspects of the invention.

In accordance with the first aspect of the invention, there is provided a stick discharging unit for use in a sausage suspending apparatus, the stick discharging unit being adapted to discharge a stick from stick supporting members provided in the sausage suspending apparatus including a plurality of suspending members for suspending a sausage, a conveyor having the suspending members and adapted to move the suspending members, and the stick supporting members for supporting the stick for receiving the sausage from the suspending members, the stick discharging unit comprising a pair of stick latching arm bodies each having a stick latching portion formed thereon and adapted to move upwardly in a forward direction, wherein the stick discharging unit is adapted to discharge the stick from the stick latching portion after each of the pair of stick latching arm bodies, during its upward movement, has taken up the stick by the stick latching portion and moved upward, and wherein the pair of stick latching arm bodies of the stick discharging unit are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies.

In the stick discharging unit in accordance with the above-described first aspect of the invention, the moving body moves upwardly in the stick discharging direction while being slidably guided by a rail body, and the driving body drives the moving body so that the moving body is moved upwardly. A pair of moving bodies are provided with the stick disposed therebetween, i.e., outside the range between the both end portions of the stick in the longitudinal direction of the stick being latched by the stick latching portions. It is possible to provide a configuration in which only one moving body of the pair of moving bodies is driven by a driving body, and the other moving body is made to follow the movement of the one moving body, or the one moving body and the other moving body are respectively driven by separate driving bodies individually.

In accordance with the second aspect of the invention, there is provided a stick discharging unit for use in a sausage suspending apparatus, the stick discharging unit being adapted to discharge a stick from stick supporting members provided in the sausage suspending apparatus including a plurality of suspending members for suspending a sausage, a conveyor having the suspending members and adapted to move the suspending members, the stick supporting members for supporting the stick for receiving the sausage from the suspending members, a stick receiving unit for receiving the stick discharged from the stick supporting members and moving the stick downwardly, and a carrying-out conveyor unit for conveying out sticks while receiving the delivery of the sticks from the stick receiving unit, the stick discharging unit comprising a pair of stick latching arm bodies each having a stick latching portion formed thereon and adapted to move upwardly in a forward direction, and after each of the pair of stick latching arm bodies, during its upward movement, has taken up the stick by the stick latching portion and moved upward, the stick discharging unit is adapted to discharge the stick from the stick latching portion and deliver the stick to the stick receiving unit having a stick receiving and lowering member, wherein the pair of stick latching arm bodies of the stick discharging unit are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies, and wherein the pair of stick latching arm bodies are located above the carrying-out conveyor unit, and the moving body and the driving body are located outside a range of the carrying-out conveyor unit in the longitudinal direction of the stick being latched by the pair of stick latching arm bodies.

In accordance with the third aspect of the invention, there is provided a stick supplying unit for use in a sausage suspending apparatus, the stick supplying unit being adapted to supply a stick onto stick supporting members provided in a sausage suspending apparatus including a plurality of suspending members for suspending a sausage, a conveyor having the suspending members and adapted to move the suspending members, and the stick supporting members for supporting the stick for receiving the sausage from the suspending members, the stick supplying unit comprising a pair of stick moving and supplying bodies which receive the stick from a stick storage device which drops and discharges the sticks one by one from a stick discharge port at a lower portion thereof, move forwardly in a perpendicular direction to a longitudinal direction of the stick, bring the stick to a predetermined advanced position immediately above the stick supporting members, and causes the stick to drop onto the stick supporting members, wherein each of the pair of stick moving and supplying bodies has a forward moving body which moves forwardly, a guide body which is provided on the forward moving body and in which a vertically penetrating stick receiving groove is formed so as to receive an end portion of the stick from above and allow the downward passage of the stick therethrough, and stick hampering members respectively disposed at a plurality of vertical positions to hamper the dropping of the stick inside the stick receiving groove at an advanced position in the stick receiving groove into which the stick hampering members have entered, and wherein, during the forward movement of the stick moving and supplying body toward the predetermined advanced position, the stick hampering members starting with an uppermost one thereof sequentially retreat from the stick receiving groove, and the stick is allowed to drop onto the stick supporting members at the predetermined advanced position upon completion of the retreat of a lowermost one of the stick hampering members from the stick receiving groove.

In accordance with the fourth aspect of the invention, there is provided a sausage suspending apparatus comprising: a plurality of suspending members for suspending a sausage; a conveyor having the suspending members and adapted to move the suspending members; stick supporting members for supporting the stick for receiving the sausage from the suspending members; and a stick discharging and supplying unit for supplying the stick onto the stick supporting members and discharging the stick from the stick supporting members, wherein the stick discharging and supplying unit has a pair of stick latching arm bodies each of which has a stick latching portion and a second stick latching portion formed thereon and is adapted to move upwardly in a forward direction, and, after the stick latching arm body, during its upward movement, has taken up the stick from the stick supporting members by the stick latching portion and moved upwardly, the stick latching arm body discharges the stick from the stick latching portion, whereupon the stick latching arm body, during its downward movement, delivers the stick latched on the second stick latching portion onto the stick supporting members, and wherein the pair of stick latching arm bodies are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies.

In accordance with the fifth aspect of the invention, there is provided a sausage suspending apparatus comprising: a conveyor having a plurality of suspending members for suspending a sausage and adapted to move the suspending members; stick supporting members for supporting a stick for receiving the sausage from the suspending members; a stick discharging unit for discharging the stick from the stick supporting members; and a stick supplying unit for supplying the stick onto the stick supporting members, wherein the stick supplying unit has a stick moving and supplying body which has a receiving port for receiving the stick dropped and supplied thereinto from above, moves forwardly in a substantially horizontal plane in a perpendicular direction to a longitudinal direction of the stick, brings the stick received from the receiving port to a predetermined advanced position immediately above the stick supporting members, and drops the stick onto the stick supporting members, and wherein the stick discharging unit has a stick latching arm body having a stick latching portion thereon and adapted to move upwardly in a forward direction, and after the stick latching arm body, during its upward movement, has taken up the stick from the stick supporting members by the stick latching portion and moved upwardly, the stick latching arm body discharges the stick from the stick latching portion, the stick being adapted to move between the stick supporting member and the suspending member located above the stick supporting member during the forward movement of the stick moving and supplying body, the receiving port of the stick moving and supplying body being adapted to receive the stick at a predetermined retreated position on an inner side of a circulating passage in the substantially horizontal plane of the conveyor.

In accordance with the sixth aspect of the invention, there is provided a sausage suspending apparatus comprising: a conveyor having a plurality of suspending members for suspending a sausage and adapted to move the suspending members; stick supporting members for supporting a stick for receiving the sausage from the suspending member; a stick discharging unit for discharging the stick from the stick supporting members; a stick receiving unit for receiving the stick discharged from the stick supporting members by the stick discharging unit, and a carrying-out conveyor unit for conveying out sticks while receiving the delivery of the sticks from the stick receiving unit, wherein a first rotational axis and a second rotational axis which form a linearly moving range of a wrapping connector moving body of the conveyor are provided with an interaxial distance longer than an overall length of the stick, wherein the carrying-out conveyor unit has an endless traveling body provided at a location of a predetermined distance from the first rotational axis between the first rotational axis and the second rotational axis in a direction of the linearly moving range of the wrapping connector moving body, and wherein the endlessly traveling body is provided at a position immediately below the wrapping connector moving body so as to travel perpendicularly to a longitudinal direction of the stick while placing thereon both end portions of the sticks delivered from the stick receiving unit provided at a position immediately above the endlessly traveling body.

According to the present invention configured as described above, it is possible to obtain the following advantages.

According to the first aspect of the invention, since the moving body and the driving body for upwardly moving the pair of stick latching arm bodies are provided outside a range between the both end portions of the stick in the longitudinal direction of the stick being latched by the pair of stick latching arm bodies, the moving body and the driving body can be made to extend to the range of the arranged height of the stick supporting members supporting the both end portions of the stick by being positioned on the inner side of the moving body and the driving body. In consequence, it is possible to reduce the stick discharging time through the reduction of the required moving distance of the stick latching arm bodies for stick discharging and make the overall apparatus compact in the heightwise direction.

According to the second aspect of the invention, since the moving body and the driving body of the stick discharging unit are positioned outside the range between the both end portions of the stick in the longitudinal direction of the stick being latched by the stick latching arm bodies, it is possible to secure a large space below within the range of the above-described stick discharging unit, which makes it possible to dispose the carrying-out conveyor unit in that space, thereby making it possible to make the overall apparatus compact by making effective use of this space and improve the operational efficiency of the apparatus because of its compact size.

Further, the pair of stick latching arm bodies of the stick discharging unit are respectively located in correspondence with both end portions of the stick in the longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies and outside the range of the carrying-out conveyor unit. Therefore, the moving body and the driving body can be made to extend to a range where they overlap with the carrying-out conveyor unit in the vertical direction, so that the apparatus can be made compact in its heightwise direction at least by a portion corresponding to the overlapping range. Since the vertical distance between the stick supporting members and the carrying-out conveyor unit can be made short, the stick can be moved downwardly onto the carrying-out conveyor unit in a short time.

Furthermore, since the stick discharged by the stick discharging unit is moved downwardly onto the carrying-out conveyor unit without being moved horizontally in the longitudinal direction of the stick, it is possible to eliminate the trouble encountered at the time of delivery of the stick from the horizontal movement to the downward movement and the trouble encountered in the horizontal movement of the stick. Still further, since the required stick moving distance to the carrying-out conveyor unit is short, it is possible to shorten the stick movement cycle time of the apparatus, making it possible to enhance the production efficiency of the apparatus.

According to the third aspect of the invention, since, during the forward movement of the stick moving and supplying body toward the predetermined advanced position, the stick hampering members starting with an uppermost one thereof sequentially retreat from the stick receiving groove, and the stick is allowed to drop onto the stick supporting members at the predetermined advanced position upon completion of the retreat of a lowermost one of the stick hampering members from the stick receiving groove, the dropping distance of the stick from the stick hampering member is extremely short, so that the stick is placed quietly on the stick supporting member without causing a shock. Furthermore, since the lowering movement of the stick inside the stick receiving groove from the state of receiving the stick to the state of supporting the stick by the lowermost stick hampering member takes place during the forward movement of the forward moving body, the operation time is prevented from becoming long due to the mentioned lowering movement. For this reason, smooth supply of sticks is made possible without making the apparatus complex or large in size in the heightwise direction.

According to the fourth aspect of the invention, since the supplying and discharging of the stick are effected by the pair of stick latching arm bodies of only one kind, and the moving body and the driving body for upwardly moving the pair of latching arm bodies are provided outside a range between the both end portions of the stick in the longitudinal direction of the stick being latched by the pair of stick latching arm bodies, it is possible to provide a sausage suspending apparatus which has a simple stick discharging and supplying unit and is compact in the heightwise direction.

According to the fifth aspect of the invention, since, with respect to stick discharging by the stick latching arm body which moves upwardly, the stick moves forwardly between the stick supporting members and the suspending members in the vertical direction and is dropped and supplied onto the stick supporting members, it is possible to make short the upward moving distance for stick discharging by the stick latching arm body, and make the upward movement time short. Since the predetermined retreated position of the stick moving and supplying body is provided inside the circulating passage, the widthwise length (in the advancing direction of the stick moving and supplying body) of the apparatus can be made short, and the forward movement time can be made short.

According to the sixth aspect of the invention, in the same way as in the second aspect of the invention, since the stick discharged by the stick discharging unit is moved downwardly onto the carrying-out conveyor unit without being moved horizontally in the longitudinal direction of the stick, it is possible to eliminate the trouble encountered at the time of delivery of the stick from the horizontal movement to the downward movement and the trouble encountered in the horizontal movement of the stick. Still further, since the required stick moving distance to the carrying-out conveyor unit is short, it is possible to shorten the stick movement cycle time of the apparatus, making it possible to enhance the production efficiency of the apparatus.

In addition, since the carrying-out conveyor unit is provided at a position located at a predetermined distance in the direction of the linearly moving range from the first rotational axis, a work area for the operator to perform the end processing operation of the sausage can be provided between the first rotational axis and the carrying-out conveyor unit, thereby facilitating the end processing operation.

In addition, since the carrying-out conveyor unit is provided at a position immediately below the wrapping connector moving body, the apparatus can be made compact in its longitudinal direction (in the moving direction of the wrapping connector moving body).

BRIEF DESCRIPTION OF THE DRAWINGS

FIGS. 4A and 4B are cross-sectional views of the stick supplying unit, in which FIG. 4A illustrates a stick moving and supplying body, and FIG. 4B illustrates a cylinder, and FIG. 4C illustrates a stick supporting member which received a stick from the stick supplying unit;

FIGS. 7A to 7D illustrate the operation of the stick moving and supplying body, in which FIG. 7A is a view at the time of reception of a stick and similar to FIG. 5A, FIG. 7B is a view at the time of forward movement of an upper stick hampering member together with a forward moving body, FIG. 7C is a view at the time of forward movement of a lower stick hampering member together with a guide body, and FIG. 7D is a view at the time of forward movement of only the guide body (the time of stick dropping);

FIGS. 8A and 8B illustrate a stick discharging unit and a carrying-out conveyor unit of the apparatus shown in FIGS. 1A and 1B, in which FIG. 8A is a top view taken in a direction perpendicular to the moving direction of a slide member of the stick discharging unit, and FIG. 8B is a front elevational view of FIG. 8A;

FIGS. 9A and 9B are side elevational views of FIGS. 8A and 8B, in which FIG. 9A is a view which is taken from the direction of the drive side and in which a drive-side conveyor side plate of the carrying-out conveyor unit is omitted, and FIG. 9B is a view which is taken from the direction of the driven side and in which a driven-side conveyor side plate of the carrying-out conveyor unit is omitted;

FIGS. 10A to 10C illustrate the drive side of the stick discharging unit, in which FIG. 10A is a plan view when a horizontal cross section is taken of a casing, FIG. 10B is a side elevational view when a vertical cross section is taken of the casing, and FIG. 10C is a side elevational view of a stick latching arm body;

FIGS. 12A to 12C illustrate the driven side of the stick discharging unit shown in FIGS. 8A and 8B, in which FIG. 12A is a view when a horizontal cross section is taken of the casing, FIG. 12B is a B-B vertical cross-sectional view of the casing, and FIG. 12C is a view taken in the direction of arrow C in FIG. 12A;

FIG. 15A is a side elevational view, taken from the drive side of the stick discharging unit, of the apparatus shown in FIG. 13, FIG. 15B is a side elevational view illustrating the stick latching arm body and a stick positioning member, and FIG. 15C is a side elevational view illustrating a stick front portion supporting member;

FIGS. 16A and 16B illustrate another embodiment apparatus concerning the stick discharging unit in accordance with the invention, in which FIG. 16A is a top view taken in the direction perpendicular to the moving direction of the slide member of the stick discharging unit, and FIG. 8B is a front elevational view of FIG. 16A;

FIGS. 17A and 17B are side elevational views of FIGS. 16A and 16B, in which FIG. 17A is a view taken from the direction of the drive side, and FIG. 17B is a view taken from the direction of the driven side;

FIGS. 18A and 18B illustrate still another embodiment apparatus concerning the stick discharging unit in accordance with the invention, in which FIG. 18A is a top view taken in the direction perpendicular to the moving direction of the slide member of the stick discharging unit, and FIG. 18B is a front elevational view of FIG. 18A; and FIGS. 19A and 19B illustrate a further embodiment apparatus concerning the stick discharging unit in accordance with the invention, in which FIG. 19A is a top view taken in the direction perpendicular to the moving direction of the slide member of the stick discharging unit, and FIG. 19B is a front elevational view of FIG. 19A.

DETAILED DESCRIPTION OF THE PREFERRED EMBODIMENTS

Hereafter, a description will be given of the embodiments of the present invention with reference to the accompanying drawings.

Figure 1A:
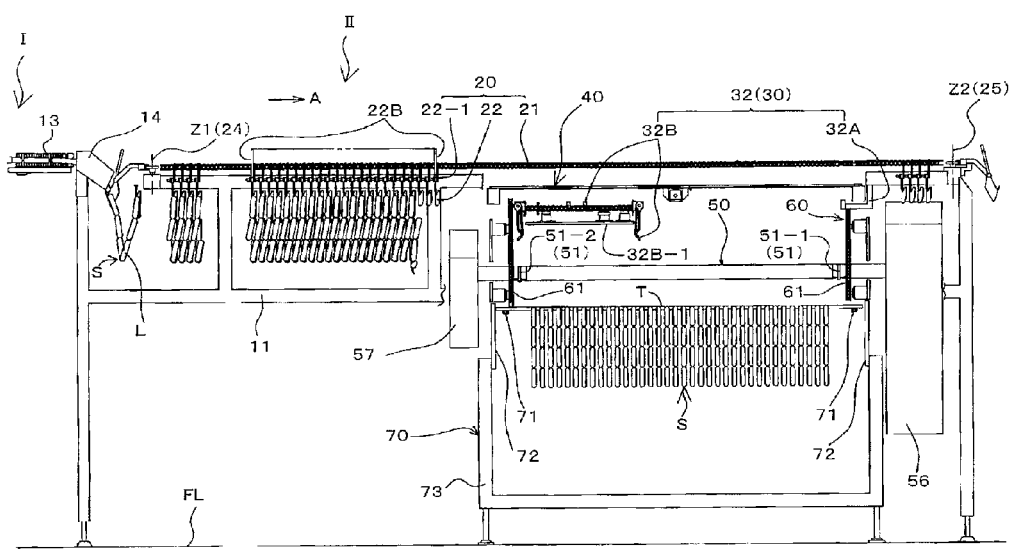
FIG. 1A is a front elevational view illustrating an overall configuration of an embodiment apparatus concerning the sausage suspending apparatus in accordance with the invention.

The apparatus of this embodiment is comprised of a sausage supplying apparatus I for stuffing a meat emulsion, i.e., the content of sausage, into a casing and for twisting the stuffed casing and carrying it out as sausage S in which a multiplicity of links are connected; and a sausage suspending apparatus II in which, upon receiving the supply of the linked sausage S, a plurality of hooks 22, which are provided on a conveyor 20 mounted on a wrapping connector moving body 21 formed in the form of a moving chain or belt, sequentially suspend the linked sausage S therefrom in loop form. FIG. 1A is a front elevational view of the apparatus of this embodiment, and FIG. 1B is a plan view thereof.

Figure 1B:
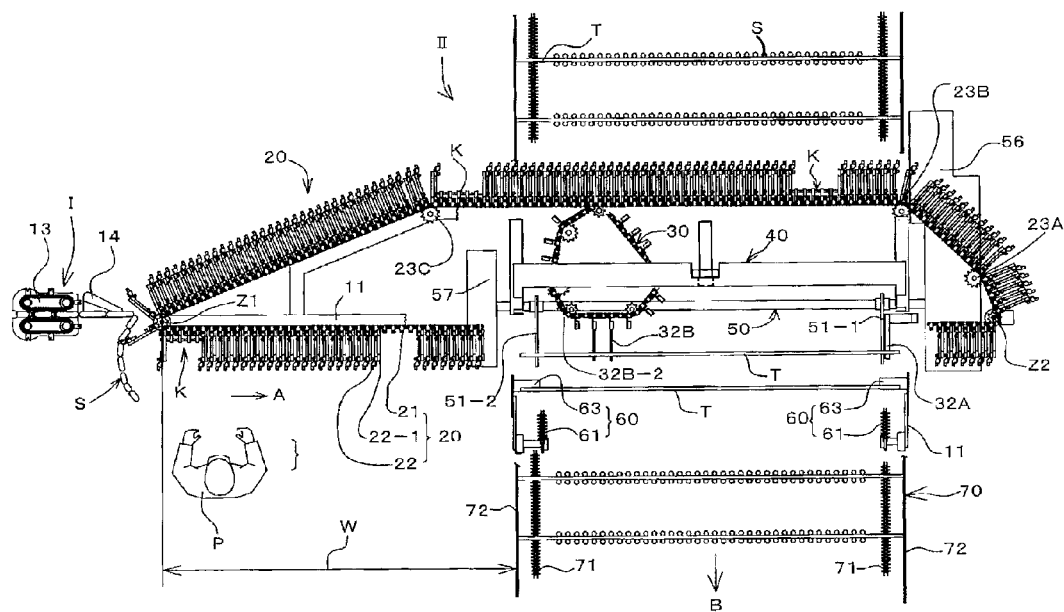
FIG. 1B is a plan view illustrating the overall configuration of the embodiment apparatus in accordance with the invention.

In FIGS. 1A and 1B, the linked sausage S carried out from the sausage supplying apparatus I is supplied to the conveyor 20 of the above-described sausage suspending apparatus II. A work area W for an operator P to perform the end processing operation of the sausage S is provided between the sausage supplying apparatus I and the sausage suspending apparatus II located forwardly in a sausage supplying direction (direction of arrow A). The conveyor 20 has the endless wrapping connector moving body 21 which circulates by rotating counterclockwise around a first rotational axis Z1, which is provided at a left end in the plan view of FIG. 1B, then by linearly moving rightwardly (in the direction of arrow A) on the side where the operator P is positioned, and further by revolving around a second rotational axis Z2 at a right end to reverse its moving direction, as well as the plurality of hooks 22 mounted on the wrapping connector moving body 21 by means of brackets 22-1. The aforementioned work area W in this example is in a range from the first rotational axis Z1 to a conveyor side plate 72 (the conveyor side plate 72 closer to the first rotational axis Z1 between a pair of conveyor side plates 72) of a carrying-out conveyor unit 70 which will be described later. Herein, the moving direction of arrow A in the range in which this wrapping connector moving body 21 linearly moves rightwardly will be referred to as the "downstream direction."

The sausage supplying apparatus I is adapted to stuff the sausage material (meat emulsion) fed out by a pump into the casing loaded on a nozzle (neither the pump nor the nozzle is shown) to form a straight pipe-like stuffed casing, which is then carried out toward the sausage suspending apparatus II by a circulating pair of linking chains 13, so as to supply the stuffed casing to the conveyor 20. The pair of linking chains 13 sends out the linked sausage S toward the conveyor 20 via a guide 14. It should be noted that the sausage S may be a straight pipe-like sausage S which is straight filled without being formed into links L.

As shown in FIGS. 1A and 1B, the sausage suspending apparatus II is provided with the conveyor 20 which has the hooks 22 serving as suspending members for suspending therefrom the sausage S in which the multiplicity of links L are connected and the endless wrapping connector moving body 21 on which the plurality of hooks 22 are attached at a predetermined pitch while forming hook absent zones K where the hooks 22 are not provided. It should be noted that FIG. 1B is a diagram in which those portions of the conveyor 20 and an apparatus housing 11 that are in a range overlapping with the carrying-out conveyor unit 70 are omitted to clearly illustrate the apparatus configuration immediately below the conveyor 20, and FIG. 1A is a diagram in which those portions are similarly omitted. The sausage suspending apparatus II has the apparatus housing 11 and rotating shafts 24 and 25 on the first rotational axis Z1 and the second rotational axis Z2, respectively, which are in the vertical direction and are located at two positions spaced apart in the direction in which the sausage is supplied from the above-described sausage supplying apparatus I (direction of arrow A), and the endless wrapping connector moving body 21, which is constituted by a chain or a belt and moves by being driven by a pair of driving wheel bodies provided on the rotating shafts 24 and 25, respectively, is wound around and trained between the two driving wheel bodies. In this example, the wrapping connector moving body 21 is constituted by a chain, and the driving wheel bodies are constituted by sprockets. This wrapping connector moving body 21 has between the aforementioned two rotational axes Z1 and Z2 a linearly moving zone (forward path moving zone) for moving from the first rotational axis Z1 toward the second rotational axis Z2 on the frontward side (lower side in FIG. 1B), i.e., the near side for the operator P, in the downstream direction A, i.e., the direction in which the sausage is supplied from the sausage supplying apparatus I, as well as a return path moving zone for moving from the second rotational axis Z2 to the first rotational axis Z1 on the rearward side. Namely, the linearly moving zone and the return path moving zone are connected at both ends to form a circulating passage. The linearly moving zone extends in such a manner as to form a straight line between the first rotational axis Z1 and the second rotational axis Z2, and the return path moving zone has a bulged path so as to move away from the aforementioned linearly moving zone by means of three guide sprockets 23A, 23B, and 23C, as shown in FIG. 1B.

Figure 2A:
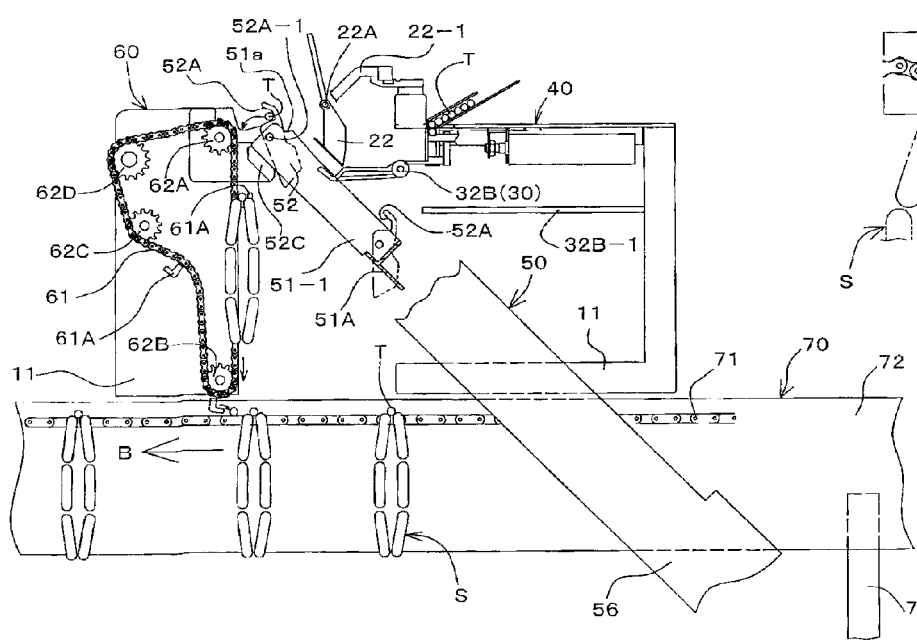
FIG. 2A is a side elevational view, taken from a downstream side, illustrating the positional relationship of various units in a major portion of the apparatus shown in FIGS. 1A and 1B.

The aforementioned hooks 22 which move in the downstream direction A are each reciprocatingly rotatable about a shaft 22A fixed to the bracket 22-1 (see FIGS. 2A and 4A). Upon reaching a position proximate to a below-described stick supporting unit 30, each hook 22 undergoes a rotational movement by a predetermined angle, whereby the hook 22 expands an interval between adjacent ones of the links L on its both sides at a suspending position to form a loop of the links L, and suspends the loop in such a form as to allow a stick T being supported by the stick supporting unit 30 to be easily inserted into the loop when the loop has moved in the downstream direction A. The aforementioned hook 22 which has moved further in the downstream direction A is adapted to effect a further rotational movement by a predetermined angle in preparation for the passage of the stick T which advances toward stick supporting members 32 (see FIG. 4A). The rotational movement is generated as an actuator pin 22B of the hook 22 slides on an unillustrated cam. It should be noted that the actuator pin 22B illustrated in FIG. 1A is omitted in the drawing of FIG. 1B.

In the sausage suspending apparatus II in accordance with this embodiment, a stick supplying unit 40 for supplying the stick T to the aforementioned stick supporting unit 30, a stick discharging unit 50 for discharging the stick T supported by the stick supporting unit 30 from the stick supporting unit 30, a stick receiving unit 60 for receiving the discharged stick T, and the carrying-out conveyor unit 70 for placing thereon the sticks removed from the stick receiving unit 60 and for sequentially conveying them to an ensuing process (in the direction of arrow B) are provided as shown in FIG. 2A which illustrates the positional relationship of the respective units. A plurality of unillustrated sausage suspending apparatuses II are arranged with respect to the carrying-out conveyor unit 70, and the sticks T delivered from the other sausage suspending apparatuses II arranged on the upstream side are also conveyed out, as shown in FIG. 1B.

The stick supporting unit 30 is located in the range of the linearly moving zone of the wrapping connector moving body 21 and is provided with the stick supporting members 32. As shown in FIG. 1A to 2A, the stick supporting members 32 support the stick T from below at a fixed position and include a stick front portion supporting member 32A for supporting a front portion of the stick T and stick rear portion supporting members 32B for supporting a rear portion of the stick T. The stick front portion supporting member 32A supports in an immobile position the front portion of the stick T in the vicinity of its front end from below and has a surface which is capable of abutting against the front end of the stick T to prevent the movement of the stick in the downstream direction A. The stick front portion supporting member 32A and the stick rear portion supporting members 32B are adapted to respectively support the front portion of the stick T and the rear portion of the stick T such that the stick T can be disposed at respective positions between adjacent ones of the links while the respective loops suspended from the hooks 22 are enlarged by the rotation of the corresponding hooks 22.

A stick rear portion supporting member base 32B-1 is disposed at a position immediately below the stick supplying unit 40 by being fixed to the apparatus housing 11 (see FIG. 2A). An endless circulating body 32B-2, on which the stick rear portion supporting members 32B are mounted and which circulatingly moves, is provided on the stick rear portion supporting member base 32B-1. As the circulating body 32B-2 moves, the stick rear portion supporting member 32B is adapted to rotate upwardly from a suspended state (see FIG. 1A) to be set to a horizontal state (see FIG. 2A) for supporting the stick, and is adapted to subsequently rotate downwardly from the horizontal state to return to the suspended state so as to release the support of the stick. The stick rear portion supporting member 32B moves in the state of supporting the stick in the moving direction A in the same way as the hooks 22 which move in the linearly moving zone.

As shown in FIGS. 3A to 5B, the stick supplying unit 40 for supplying the stick T to the above-described stick supporting unit 30 has a stick storage device 41 for storing the plurality of sticks T and a pair of stick moving and supplying bodies 42 which move upon receiving only one stick T from the stick storage device 41, and deliver the stick T onto the stick supporting members 32 of the stick supporting unit 30 at a predetermined advanced position.

The aforementioned stick storage device 41 has a pair of chute portions 41A which are mounted on the apparatus housing 11, store the multiplicity of sticks T, and lower and guide the sticks T one at a time while arranging them in a row.

The pair of chute portions 41A are provided by being positioned in correspondence with the stick supporting members 32 supporting the stick T at its both end portions and arranged on both sides in the longitudinal direction of the stick T, and by being positioned on the inner side (closer to the return path moving zone) of the linearly moving zone of the circulating passage of the wrapping connector moving body 21 and above the stick supporting members 32. As also shown in FIG. 4A, the pair of chute portions 41A extend diagonally downwardly in such a manner as to arrange the sticks T in a row, and, as shown in FIG. 3B, are disposed on both end sides, respectively, of the stick T so as to guide the respective ends of the stick T. A guide groove 41A-1 which is open in an opposing manner in the longitudinal direction of the stick T is formed in each of the pair of chute portions 41A, and the guide groove 41A-1 is open at its lower end as well.

Figure 3A:
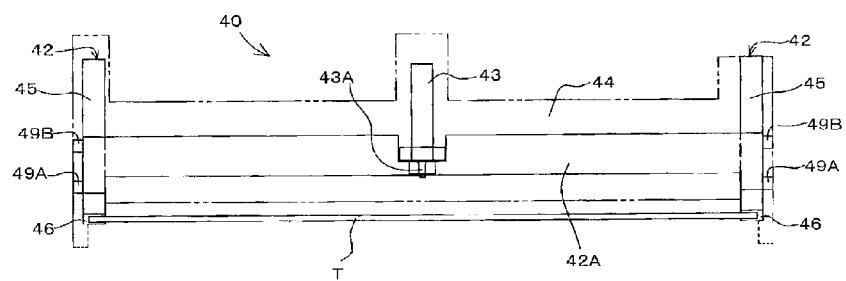
FIG. 3A is a top view of a stick supplying unit of the apparatus shown in FIGS. 1A and 1B.
Figure 3B:
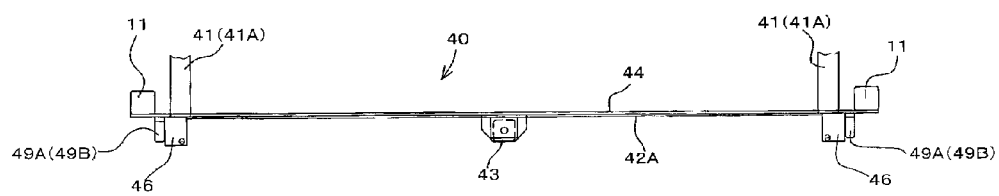
FIG. 3B is a front elevational view thereof.

As shown in FIGS. 3A to 5B, each of the pair of stick moving and supplying bodies 42 extends in a horizontal direction perpendicular to the longitudinal direction of the stick T from a stick receiving position, which is located on the inner side of the circulating passage in a substantially horizontal plane of the conveyor 20 and is located immediately below the respective chute portion 41A. This stick moving and supplying body 42 is adapted to move from the just-mentioned stick receiving position, where its front end is positioned immediately below the chute portion 41A, to the aforementioned "predetermined advanced position," which is a position immediately above a stick supporting position (a V-shaped receiving portion at a distal end of the stick supporting member 32) of the stick supporting member 32 being maintained in a horizontal state, the stick supporting position being at a predetermined distance from the stick receiving position. As shown in FIGS. 3A and 3B, the two stick moving and supplying bodies 42 which form a pair are coupled by a plate-like coupling arm 42A, and as the coupling arm 42A is driven by a cylinder rod 43A of a cylinder 43 mounted on a base plate 44 connected to the apparatus housing 11, both stick moving and supplying bodies 42 are adapted to move together forwardly to that position immediately above toward the stick supporting members 32 and subsequently retreatedly move from the position immediately above to the stick receiving position.

Figure 5B:
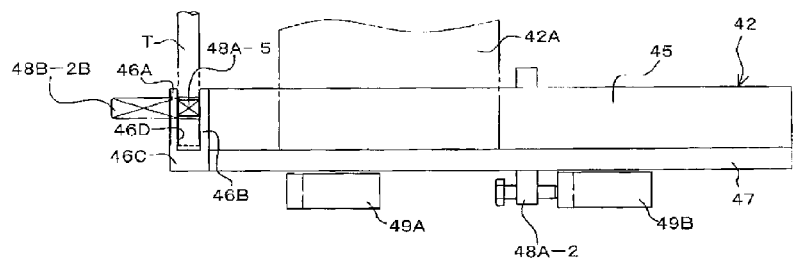
FIG. 5B is a plan view thereof.
Figure 5A:
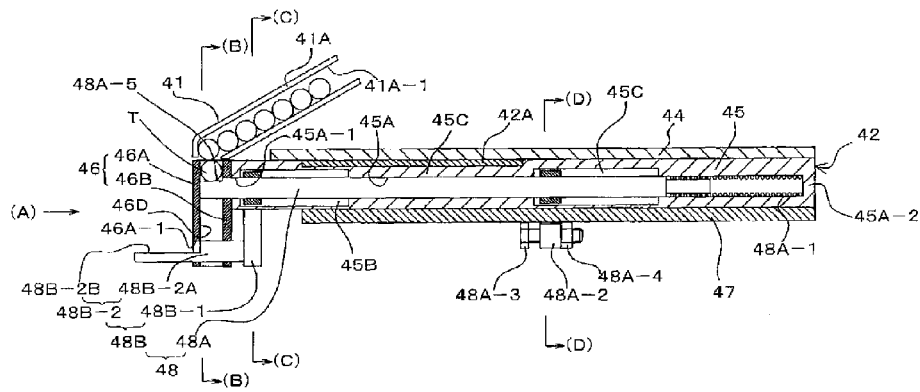
FIG. 5A is a cross-sectional view, taken along a plane extending in the back-and-forth at the time of stick reception, of the stick moving and supplying body.

As shown in FIGS. 5A and 5B, which illustrate a state in which the distal end portion (front end portion) of the stick moving and supplying body 42 is located immediately below the chute portion 41A, the stick moving and supplying body 42 has a horizontally long housing-like forward moving body 45, a guide body 46 attached to a distal end of the forward moving body 45 to receive the stick T from the chute portion 41A, and a stick hampering member 48 for hampering the dropping of the stick T from the guide body 46. The stick hampering member 48 has an upper stick hampering member 48A and a lower stick hampering member 48B respectively positioned at higher and lower positions.

The stick supplying unit 40 shown in FIG. 1B is in a state in which the stick moving and supplying bodies 42 have completed the retreating movement to the stick receiving position. The stick moving and supplying bodies 42 in that state are located on the inner side of the circulating passage in the substantially horizontal plane of the conveyor 20, and their guide bodies 46 (see FIG. 3A) are at a standstill at the stick receiving position. As for the stick moving and supplying body 42, an upper end of a guide groove 46D of the guide body 46 constitutes a receiving port of the stick moving and supplying body 42, and is adapted to receive the stick T at the aforementioned stick receiving position.

The forward moving body 45 has a horizontally long rectangular parallelepiped-shaped outer configuration extending back and forth (left and right in FIGS. 5A and 5B), and a guide hole 45A is formed in a center of the forward moving body 45 to accommodate the rod-like upper stick hampering member 48A, which extends in the longitudinal direction, relatively movably back and forth within a range of a predetermined distance relative to the forward moving body 45.

Figure 6A:
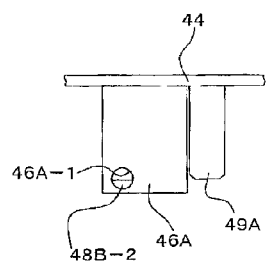
FIG. 6A is view taken in the direction of arrow A in FIG. 5A.
Figure 6B:
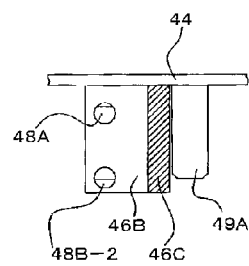
FIG. 6B is a B-B cross-sectional view of FIG. 5A.

The above-described forward moving body 45 is supported by a guide block 47 in a state of being coupled to the already described plate-like coupling arm 42A in a shallow step-like depressed portion formed in its upper surface (see FIG. 6D as well), is driven by the cylinder 43 mounted on the base plate 44 connected to the apparatus housing 11, and is moved back and forth in a state of being located between the guide block 47 and the lower surface of the base plate 44.

Figure 6C:
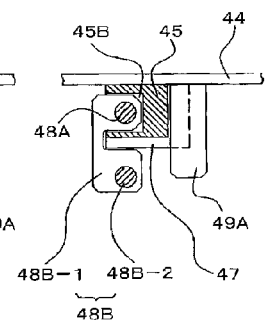
FIG. 6C is a C-C cross-sectional view thereof.
Figure 6D:
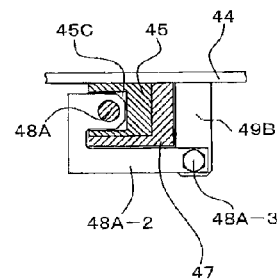
FIG. 6D is a D-D cross-sectional view thereof.

In FIG. 5A and as also shown in FIG. 6C, the aforementioned guide hole 45A coaxially communicates with a through hole 45A-1 formed in a front end wall of the forward moving body 45 and is closed by a rear end wall 45A-2. The guide hole 45A communicates with a front opening 45B and an intermediate opening 45C which are respectively open laterally in a front portion of the forward moving body 45 and in an intermediate portion thereof nearer the rear side. As for the upper stick hampering member 48A supported in the above-described guide hole 45A, its front end portion is passed through the aforementioned through hole 45A-1 and projects forwardly, while, on the rear side, a clearance is left between a rear end of the upper stick hampering member 48A and the rear end wall 45A-2, and a compression spring 48A-1 is disposed in the space of this clearance. As for the upper stick hampering member 48A, its rear end portion is slightly smaller in diameter in comparison with its front portion, and a front portion of the compression spring 48A-1 is supported by its outer peripheral surface. The compression spring 48A-1, upon being compressed, resiliently presses the upper stick hampering member 48A forwardly.

A retaining piece 48A-2 is fixedly mounted on the above-described upper stick hampering member 48A at its intermediate position in the back-and-forth direction in the state of FIG. 5A, and the retaining piece 48A-2 is movable integrally with the upper stick hampering member 48A. As shown FIG. 6D, the retaining piece 48A-2 is suspended downwardly outside the forward moving body 45 and has a protruding portion which extends horizontally toward a below-described rear stopper 49B, and a retaining bolt 48A-3 is fitted to that protruding portion by means of a nut 48A-4.

Laterally outside the upper stick hampering member 48A, a front stopper 49A and a rear stopper 49B, which are inverse L-shaped as shown in FIGS. 5A and 5B and FIGS. 7A to 7D, are mounted on the base plate 44. When the upper stick hampering member 48A is at the position shown in FIG. 5A, a rear end of the aforementioned retaining bolt 48A-3 abuts against the rear stopper 49B.

Further, a flat upper stick receiving surface 48A-5 for receiving the stick T is formed on a front end portion of the upper stick hampering member 48A. In addition, the lower stick hampering member 48B is attached to the front end portion of the upper stick hampering member 48A at a position behind the aforementioned upper stick receiving surface 48A-5. The lower stick hampering member 48B has a mounting portion 48B-1 fixed to and suspended from the upper stick hampering member 48A and a hampering portion 48B-2 protruding forwardly from a lower end of the mounting portion 48B-1.

The aforementioned hampering portion 48B-2 has, in the back-and-forth direction, a base portion 48B-2A extending from a position corresponding to a front edge of the upper stick receiving surface 48A-5 of the upper stick hampering member 48A in the state of FIG. 5A to the mounting portion 48B-1, as well as a portion extending forwardly from that base portion 48B-2A, a flat lower stick receiving surface 48B-2B being formed on an upper surface of that extended portion.

The guide body 46 is attached to the front end of the forward moving body 45, as described before. The guide body 46 is located immediately below the already described chute portion 41A in the state of FIG. 5A such that an upper end of the guide body 46 is located closest to a lower end of the chute portion 41A. It should be noted that a configuration may be provided such that the forward moving body 45 and the guide body 46 are integrated as a single member, and the stick receiving groove is formed in the integrated forward moving body 45. In that configuration as well, the guide body is provided on the forward moving body.

As shown in FIGS. 5A and 5B, the above-described guide body 46 has a front wall 46A and a rear wall 46B which are positioned with a slightly larger interval than the diameter dimension of the stick T, and the front wall 46A and the rear wall 46B are connected by a connecting wall 46C at a position close to the end portion of the stick T, such that the guide groove 46D is thereby formed which is open on one side in the longitudinal direction of the stick T and functions as a vertically penetrating stick receiving groove, as shown in FIG. 5B. The inner surface of the guide groove 46D in FIG. 5B is at substantially the same position as the position where the inner surface of the guide groove 41A-1 of the chute portion 41A is extended downwardly. As shown in FIGS. 3A and 3B, the above-described guide body 46 is mounted on each of the two forward moving bodies 45 disposed so as to form a pair on both sides of the stick T, and, as for the pair of guide bodies 46, the laterally open sides of the vertically penetrating guide grooves 46D are opposed to each other (see FIG. 6B).

Figure 7A:
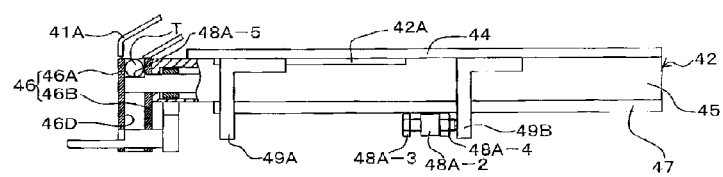
Figure 7B:
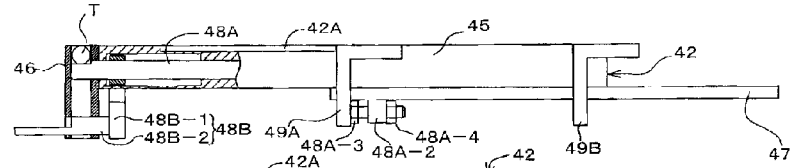
Figure 7C:
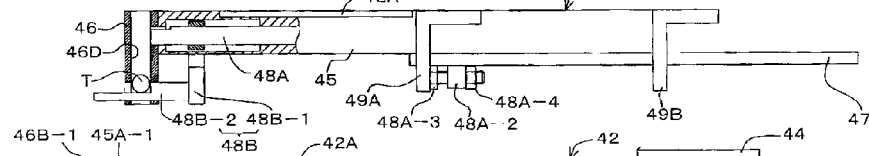
Figure 7D:
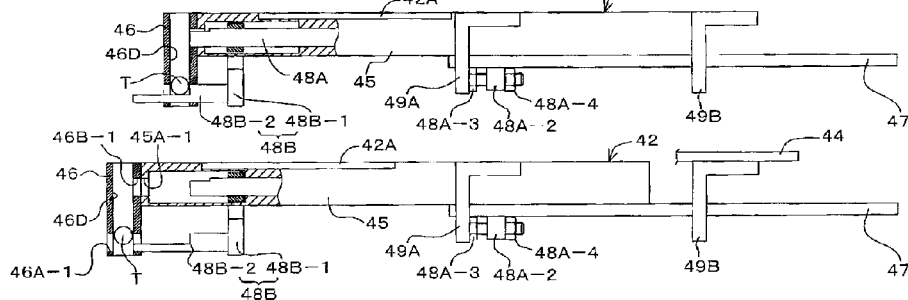

As also shown in FIG. 7D, as for the guide body 46, a hole portion 46B-1 for allowing the passage of the rod-like upper stick hampering member 48A is formed in its rear wall 46B. In addition, as shown in FIGS. 5A and 6A, a hole portion 46A-1 for allowing the forward projection of the hampering portion 48B-2 of the above-described lower stick hampering member 48B is formed in the front wall 46A.

As also shown in FIGS. 8A to 9B, the stick discharging unit 50 includes the following: two moving bodies 51B which are located outside the both end portions of the stick T in the longitudinal direction of the stick with respect to the stick T being supported by the two arm-like stick supporting portions 32A and 32B of the already described stick supporting unit 30; one arm-like stick latching arm body 51-1 located on the inner side in the longitudinal direction of the stick with respect to the stick front portion supporting member 32A and another arm-like stick latching arm body 51-2 located on the outer side in the longitudinal direction of the stick with respect to the stick rear portion supporting member 32B; and two discharge hook members 52 which are each attached rotatably at an upper end of each stick latching arm body 51 and is rotatively driven at a predetermined timing. Both stick latching arm bodies 51 are coupled by a coupling member 51A at their lower portions. One slide member 51B-1 and another slide member 51B-2, which serve as the aforementioned moving bodies 51B for upwardly moving both stick latching arm bodies 51 by upwardly moving in the stick discharging direction, are mounted at both ends of the coupling member 51A in parallel with the respective stick latching arm bodies 51.

The mutual positional relationship of the one stick latching arm body 51-1 with respect to the stick front portion supporting member 32A and the mutual positional relationship of the other stick latching arm body 51-2 with respect to the stick rear portion supporting member 32B are not limited to the relationships in the above-described embodiment. For example, it is also possible to adopt a configuration in which the position of the stick supporting members 32 is altered such that the one stick latching arm body 51-1 is located on the outer side of the stick front portion supporting member 32A, while the other stick latching arm body 51-2 is located on the inner side of the stick rear portion supporting members 32B.

The stick discharging unit in accordance with the present invention has a rail pair 52B for slidably guiding the two moving bodies 51B. In the stick discharging unit 50 of this embodiment, a pair of rail bodies 52B-1 and 52B-2 for slidably guiding the aforementioned slide members 51B-1 and 51B-2 are provided in such a manner as to extend diagonally upwardly along each stick latching arm body 51. The rail bodies 52B-1 and 52B-2 are provided in such a manner as to extend from a position in the vicinity of an installation floor surface FL of the apparatus toward the stick supporting members 32. Accordingly, a large space for the carrying-out conveyor unit 70 is secured between both rail bodies 52B-1 and 52B-2 and between the stick latching arm bodies 51 below the stick supporting unit 30 and the stick supplying unit 40 (see FIG. 1A).

As described above, the one slide member 51B-1 and the other slide member 51B-2 as well as the rail bodies 52B-1 and 52B-2 are disposed outside both end portions of the stick T in the longitudinal direction of the stick T with respect to the stick T supported by the stick supporting members 32A and 32B, outside the range between both end portions of the stick T in the longitudinal direction of the stick T latched by the one stick latching arm body 51-1 and the other stick latching arm body 51-2, and outside both of the pair of conveyor side plates 72 (outside the range of the carrying-out conveyor unit 70) provided in the space for the above-described carrying-out conveyor unit 70.

Thus, the one stick latching arm body 51-1 and the other stick latching arm body 51-2 of the stick discharging unit 50 are located in correspondence with the both end portions of the stick T in the longitudinal direction of the stick T; the one moving body 51B-1 for upwardly moving the one stick latching arm body 51-1 and the other moving body 51B-2 for upwardly moving the other stick latching arm body 51-2 are provided outside the range between both end portions of the stick T in the longitudinal direction of the stick T; and a driving body 54 for driving the one moving body 51B-1 is provided outside the range between both end portions of the stick T in the longitudinal direction of the stick T latched by the pair of stick latching arm bodies 51.

As shown in FIG. 2A, the above-described stick latching arm body 51 has a stick latching portion 51a formed at its upper end edge as a notched portion, and when the above-described slide member 51B-1 upwardly moves, the stick latching portion 51a in a process of reaching up to its uppermost position lifts and takes up from below the stick T being supported by the stick supporting members 32 and carries it to a discharging position at the uppermost position. When viewed from above, the stick T which reached the discharging position at the uppermost position is in a state of being parallel to the stick T persisting when it was arranged by the stick supporting members 32 along the linearly moving range of the wrapping connector moving body 21 (see FIGS. 1B and 8A).

The discharge hook member 52 attached rotatably to the upper end portion of the stick latching arm body 51 has a hook portion 52A formed thereon at such a position and in such a shape as to substantially coincide with the stick latching portion 51a serving as the notched portion of the stick latching arm body 51 and persisting when the stick latching arm body 51 is at a lowermost position (see the hook portion 52A at the two-dotted dash line in FIG. 2A). When the stick latching arm body 51 has reached the uppermost position, the movement of the discharge hook member 52, in which the discharge hook member 52 is rotatively driven and its hook portion 52A is rotated counterclockwise about a rotational center 52A-1, is completed.

It should be noted that, without forming the stick latching portion 51a on the stick latching arm body 51, the stick T being supported by the stick supporting members 32 may be lifted and taken up by the discharge hook member 52 and may be carried to the discharging position at the uppermost position. In this configuration as well, the stick latching portion is formed on the stick latching arm body.

In addition, without providing the discharge hook member 52 in the stick latching arm body 51, a device for taking up the stick T from the stick latching portion 51a may be provided, and the stick T may be discharged from the stick latching portion 51a by that device.

Figure 2B:
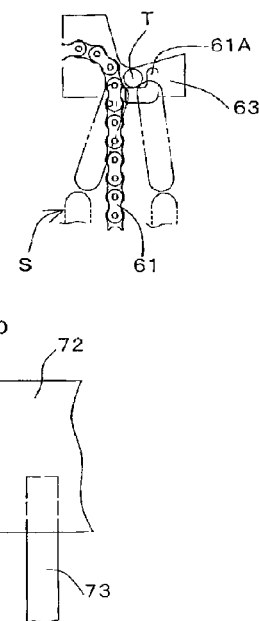
FIG. 2B is an enlarged view illustrating only a section concerning a hook portion of a stick receiving unit shown in FIG. 2A.

As shown in FIGS. 1A, 1B, and 2A, the stick receiving unit 60 is disposed in front of the above-described stick discharging unit 50. The stick receiving unit 60 has a pair of takeup chains 61 which are respectively located in correspondence with the above-described two stick latching arm bodies 51 which form a pair in the longitudinal direction of the stick. As shown in FIG. 2A, each of the pair of takeup chains 61 is stretched so as to form a circulating passage by means of sprockets 62A, 62B, 62C, and 62D, and a lowering movement range where the takeup chain 61 travels between the sprockets 62A and 62B is arranged such that its upper end is located in correspondence with an upper end of the stick latching arm body 51 at its uppermost position. On the aforementioned takeup chain 61, two hook portions 61A serving as stick receiving and lowering members which take up the stick T and downwardly move are provided at an interval larger than the length of the sausage loop. When the hook portion 61A is on a standby at an upper end position of the aforementioned lowering movement range (see FIG. 2B), the discharge hook member 52 attached to the stick latching arm body 51, upon reaching the uppermost position, is rotatively driven by a cam 52C, whereby the stick T is discharged from the rotated hook portion 52A and is delivered to the respective hook portion 61A. As shown in FIG. 2B, as for the delivery of the stick T to both hook portions 61A, the arrangement provided is such that the stick T is temporarily received by a pair of stick receiving tools 63 fixed to the apparatus housing 11, and the stick T placed on the stick receiving tools 63 is then delivered to both hook portions 61A. However, without the intermediation by the stick receiving tools 63, the stick T discharged from the hook portions 52A may be directly delivered to the pair of hook portions 61A.

As shown in FIGS. 1A, 1B, and 2A, the carrying-out conveyor unit 70 which receives and conveys out the sticks T from the stick receiving unit 60 is positioned below the above-described stick receiving unit 60. In FIG. 1B, the conveying direction of the carrying-out conveyor unit 70 is indicated by arrow B, which direction is orthogonal to the direction of arrow A, i.e., the moving direction of the conveyor 20 in the linearly moving zone. The carrying-out conveyor unit 70 has a pair of endless traveling chains 71 serving as endless traveling bodies for supporting both ends of the sticks T, the pair of conveyor side plates 72, and a conveyor housing 73, and the carrying-out range of the traveling chains 71 is located immediately below the above-described stick receiving unit 60. The endless traveling body is not limited to the traveling chain 71, and may be an endless belt. As already described, a large space is secured for the stick discharging unit 50 below the stick supporting unit 30 and the stick supplying unit 40, and the carrying-out conveyor unit 70 is installed by making use of this space, as also shown in FIG. 1A.

Thus, the stick latching arm bodies 51 of the stick discharging unit 50 are located above the inner region of the carrying-out conveyor unit 70, and, in the longitudinal direction of the stick T being latched by the stick latching arm bodies 51, the rail bodies 52B-1 and 52B-2, the slide members 51B-1 and 51B-2, and a motor 54 serving as a driving body, which are related to the stick latching arm bodies 51, are located laterally outside the aforementioned space, i.e., outside the range of the carrying-out conveyor unit 70 which is laterally outside the above-described inner region of the carrying-out conveyor unit 70, in other words, laterally outside both end portions of the stick T being supported by the stick supporting unit 30. Therefore, in the vertical direction, the lower portion of the stick discharging unit 50 can be positioned in a state of being overlapped with the carrying-out conveyor unit 70 which is also located in the aforementioned space. It is thereby possible to make the apparatus in the vertical direction compact in size.

Next, referring also to FIGS. 7A to 7D which illustrates the operation of the stick moving and supplying bodies 42, a description will be given of the operation of the above-described apparatus of this embodiment in accordance with the present invention, specifically how the stick T is supplied to the stick supporting unit 30 and how the stick T is discharged after the sausage S has been hung in loop form. It should be noted that although FIGS. 7A to 7D sequentially illustrate the operation of the stick moving and supplying body 42, the operation position in FIG. 7A is the same as that in FIG. 5A.

(1) The linked sausage S carried out from the sausage supplying apparatus I is moved toward the stick supporting unit 30 in conjunction with the movement of the conveyor 20, while being consecutively suspended, i.e., suspended in loop form, from the plurality of hooks 22 provided on the conveyor 20 of the sausage suspending apparatus II.

(2) The sticks T are supplied one by one from the stick supplying unit 40 to the stick supporting unit 30. Inside the chute portion 41A of the stick supplying unit 40, the plurality of sticks T are guided downwardly in such a manner as to be arranged in a row. The stick moving and supplying body 42 of the stick supplying unit 40 is at a retreated position, which is the stick receiving position shown in FIG. 7A, and the guide body 46 attached to the front end of the forward moving body 45 is positioned immediately below the aforementioned chute portion 41A. When the guide body 46 is at this position, the front end of the upper stick hampering member 48A with the upper stick receiving surface 48A-5 formed thereon has passed through the hole portion 46B-1 formed in the rear wall 46B of the guide body 46, and the aforementioned upper stick receiving surface 48A-5 has plunged into the guide groove 46D between the front wall 46A and the rear wall 46B. Accordingly, only one stick T which dropped from the chute portion 41A into the guide groove 46D is being supported on the aforementioned upper stick receiving surface 48A-5 in a state in which its further dropping is prevented.

(3) When only one stick T is accommodated in the guide body 46, the forward moving body 45 moves by being driven forwardly by the cylinder rod 43A through the coupling arm 42A under the actuation of the cylinder 43 mounted on the base plate 44 (see FIG. 7B). Since the compression spring 48A-1 is disposed in the rear portion of the guide hole 45A of the forward moving body 45 between the rear end portion of the upper stick hampering member 48A and the rear end wall 45A-2 of the forward moving body 45, when the forward moving body 45 advances under the actuation of the cylinder 43, the upper stick hampering member 48A also advances together with the aforementioned forward moving body 45 by the force of the aforementioned compression spring 48A-1. Since the retaining piece 48A-2 is attached to the upper stick hampering member 48A and the retaining bolt 48A-3 is fitted to that retaining piece 48A-2 by means of the nut 48A, the retaining bolt 48A-3 also advances in conjunction with the forward movement of the upper stick hampering member 48A, and that retaining bolt 48A-3 abuts against the front stopper 49A and stops. Accordingly, the upper stick hampering member 48A also stops, and its further advancement is hampered (see FIG. 7B).

(4) Even if the advancement of the upper stick hampering member 48A has come to be hampered by the front stopper 49A, since the forward moving body 45 continues to be subjected to the forwardly moving force by the actuation of the cylinder 43 through the coupling arm 42A, the forward moving body 45 advances further. The guide body 46 attached to the front end of the forward moving body 45 also advances together with the forward moving body 45 (see FIG. 7C). Since the upper stick hampering member 48A remains at the position of FIG. 7B and the guide body 46 advances, in FIG. 7C, the upper stick hampering member 48A comes to be relatively located at a retreated position with respect to the guide body 46, and the upper stick receiving surface 48A-5 of that upper stick hampering member 48A becomes absent in the guide groove 46D of the guide body 46, whereupon the stick T drops and is received by the hampering portion 48B-2 of the lower stick hampering member 48B located below the upper stick hampering member 48A (see FIG. 7C).

(5) The forward moving body 45 and the guide body 46 advance further, and reach immediately above a predetermined stick supporting position of the stick supporting member 32. Accordingly, the lower stick hampering member 48B is relatively retreated with respect to the guide body 46 by the further advancement of the forward moving body 45 and the guide body 46, with the result that the guide groove 46D of the guide body 46 is made downwardly open (see FIG. 7D), thereby causing the stick T drop from the guide groove 46D to the predetermined stick supporting position of the stick supporting member 32 and to be arranged thereon (see FIGS. 4A and 4C). In this case, since the stick T is dropped from the position of the lower stick hampering member 48B lower than the position of the upper stick hampering member 48A shown in FIG. 7B, and the lower stick hampering member 48B is positioned immediately above and in close proximity to the stick supporting member 32, the dropping distance is very short, so that the stick T is placed on the stick supporting members 32A and 32B quietly without being accompanied by a shock. Furthermore, since the dropping operation of the stick T inside the guide groove 46D from the state of receiving the stick T from the chute portion 41A of FIG. 7A until the state of supporting the stick T of FIG. 7C by the lower stick hampering member 48B is carried out during the advancement of the forward moving body 45, the operation time is prevented from becoming long due to the above-described lowering operation.

In preparation for the forward movement of the stick moving and supplying body 42, the hook 22 is rotated rearwardly (see arrow in FIG. 4A) and is moved away upwardly from the stick supporting members 32A and 32B. The stick T which moves together with the stick moving and supplying body 42 passes through the vertical space between, on the one hand, the hook 22 which finished the rearward rotation and, on the other hand, the stick supporting members 32A and 32B, moves forwardly, and reaches up to immediately above the stick supporting position (predetermined advanced position).

(6) When the stick T is brought to the predetermined stick supporting position of the stick supporting members 32, the sausage S being suspended from the hook 22 while forming a loop has the width between the links at the loop top enlarged by the rotation of the hook 22, which permits the stick T on the stick supporting members 32 to be easily inserted into the loop, and the hook 22 passes the stick rear portion supporting member 32B.

Figure 8A:
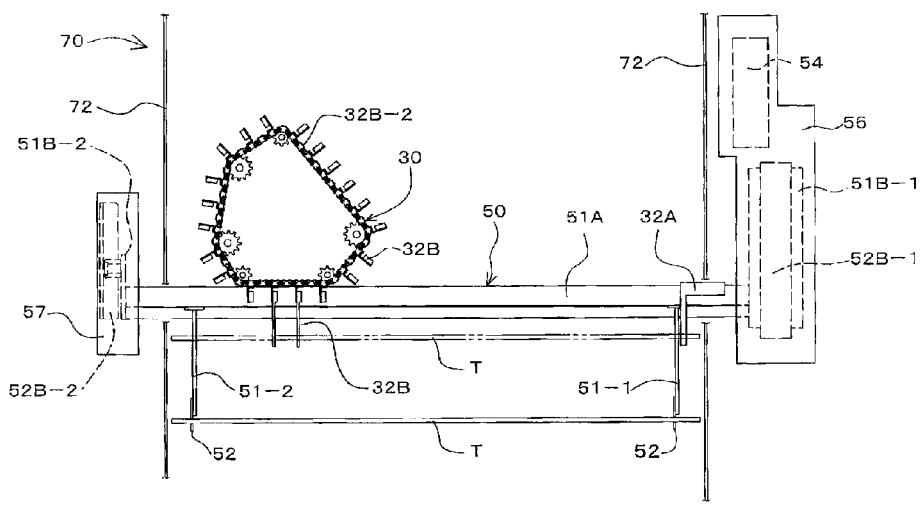
Figure 8B:
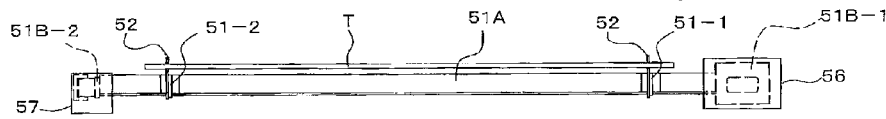

(7) When the loop of the sausage S is subjected to the insertion thereinto of the stick T on the stick supporting members 32, the motor 54 serving as the driving body of the stick discharging unit 50 shown in FIG. 8A is operated to upwardly move the other slide member 51B-2 coupled to the one slide member 51B-1 through the coupling member 51A. Accordingly, both stick latching arm bodies 51 connected to both ends of the coupling member 51A are also raised. As shown in FIG. 2A, the stick latching arm bodies 51 lift up and take up the stick T from the stick supporting members 32 by the stick latching portions 51a formed at the respective upper ends of the stick latching arm bodies 51 in their upwardly rising process, bring the stick T further upwardly, receive the loops from the suspending members 22 during the upward movement to the uppermost position, and then reach the uppermost position.

(8) In the process in which the stick latching arm bodies 51 with the stick T latched thereon reach the uppermost position, each discharge hook member 52 rotates with respect to the stick latching arm body 51, and the stick T is discharged forwardly by the hook portion 52A of each discharge hook member 52 (see FIG. 2A).

(9) The stick T discharged from the stick latching arm bodies 51 of the stick discharging unit 50 is released forwardly and drops onto the stick receiving tools 63. However, since the arrangement provided is such that the pair of hook portions 61A are at a standstill at the position immediately below the pair of receiving tools 63, the stick T is taken up by the hook portions 61A through the stick receiving tools 63 (see FIG. 2B).

(10) The stick T, which thus came to be supported by the respective hook portions 61A provided on the pair of takeup chains 61 of the above-described stick receiving unit 60, is lowered in their downwardly moving range, and when the takeup chains 61 each undergo a shift in the direction at the sprocket 62B in the lowermost position, the stick drops from the respective hook portion 61A at the time of its change in direction, and is placed on the pair of traveling chains 71 of the carrying-out conveyor unit 70 positioned below. The sausages suspended from the sticks T are conveyed out in the direction of arrow B for the ensuing process (see FIG. 2A).

(11) Meanwhile, as for each stick moving and supplying body 42 after supplying the stick T to the stick supporting unit 30, the forward moving body 45 is retreated as the cylinder rod 43A of the cylinder 43 is retracted. At that juncture, since the guide body 46 attached to the front side of the forward moving body 45 presses the upper stick hampering member 48A rearwardly, that upper stick hampering member 48A as well as the lower stick hampering member 48B attached thereto are also retreated. During its retreat, the upper stick hampering member 48A is pressed forwardly by the compression spring 48A-1, so that the stick moving and supplying body 42 is thus returned to the state of FIG. 7A. At that juncture, the retaining bolt 48A-3 is abutted against the rear stopper 49B, thereby fixing the retreated position of the upper stick hampering member 48A.

Figure 9B:
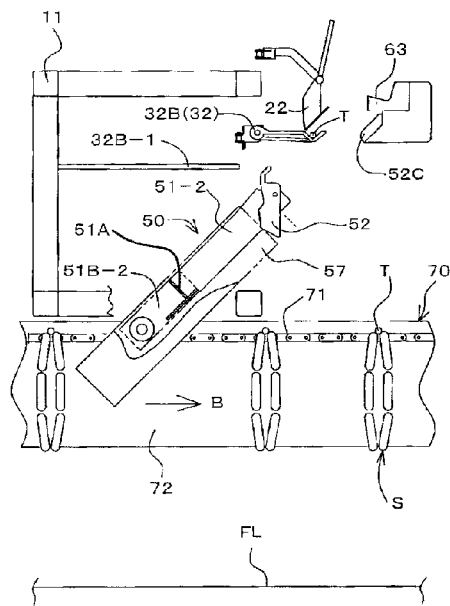
Figure 9A:
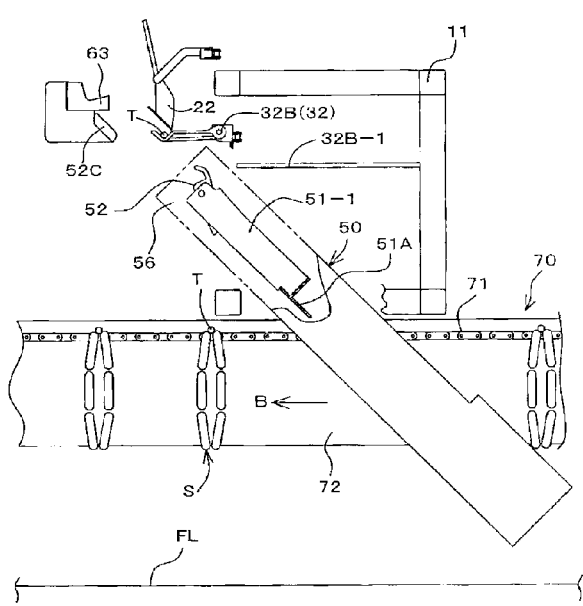
Figures 10A, 10B:
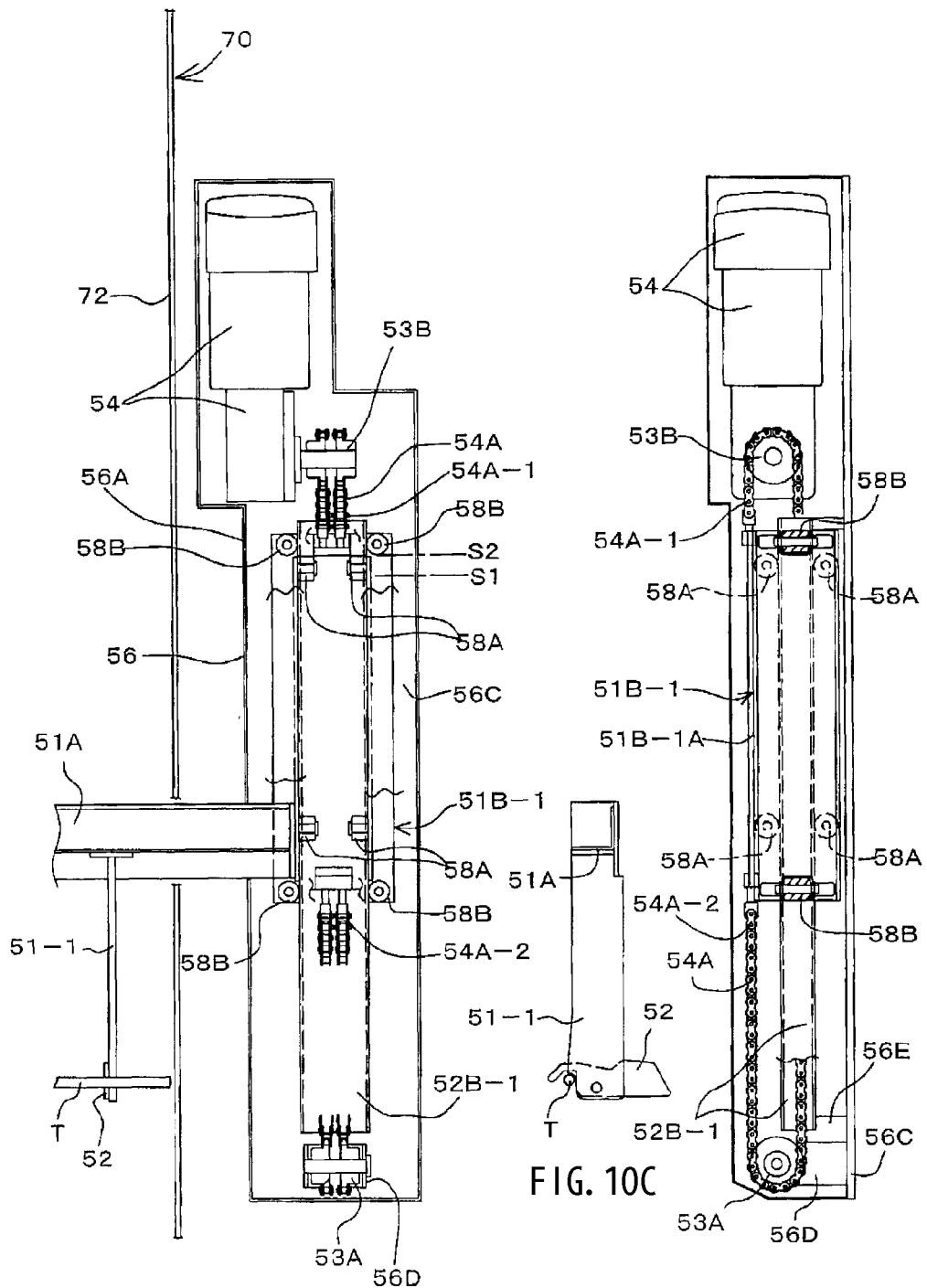
Figure 11:
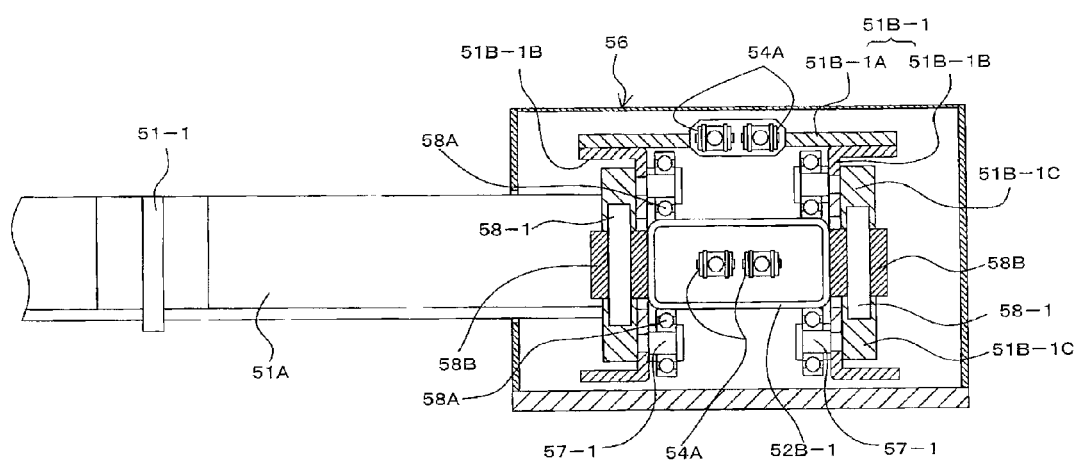
FIG. 11 is a cross-sectional view taken along a plane perpendicular to the moving direction of a slide member in the stick discharging unit shown in FIGS. 10A to 10C.
Figure 12:
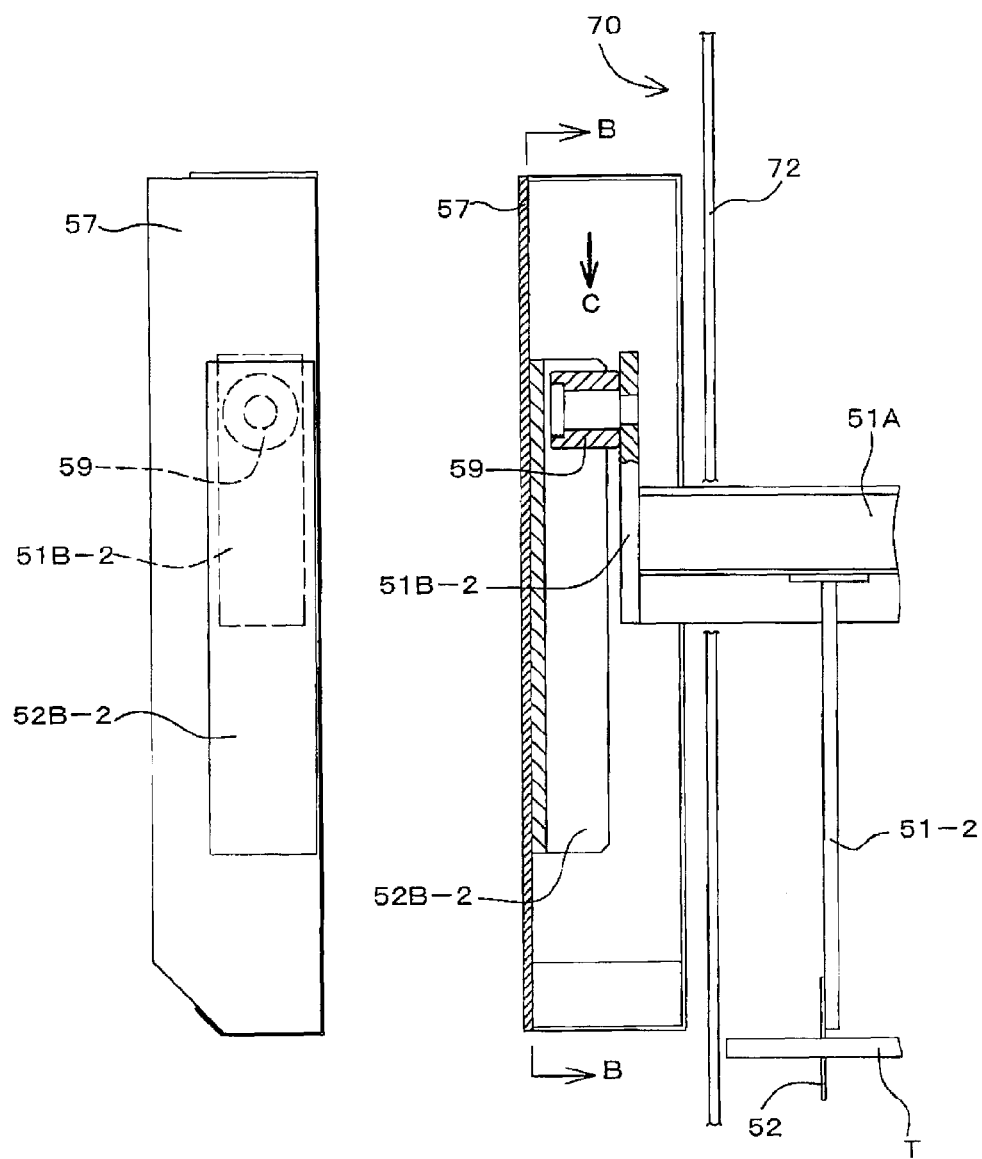
Figure 13:
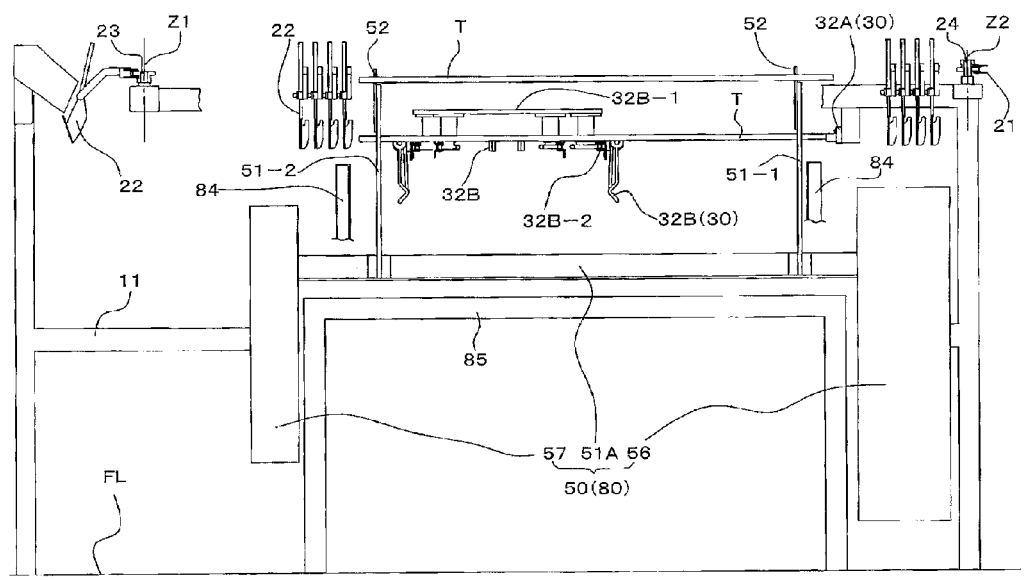
FIG. 13 is a front elevational view of another embodiment apparatus concerning the sausage suspending apparatus in accordance with the invention, mainly illustrating the stick supplying unit, the stick discharging unit, and their vicinities.

Next, with reference to FIGS. 10A to 12C, a description will be given of a more specific example of a mechanism for driving the stick latching arm bodies 51 of the stick discharging unit 50 shown in FIGS. 8A to 9B. FIGS. 10A and 12A are diagrams in which a view is taken from an upper direction perpendicular to the moving direction of the respective slide members 51B-1 and 51B-2 when a drive casing 56 and a driven casing 57 are cut away. FIGS. 10B and 12B are diagrams in which a view is taken from a lateral direction with respect to FIGS. 10A and 12A. FIG. 11 is a cross-sectional view in a plane perpendicular to the moving direction of the one slide member 51B-1.

FIGS. 10A to 10C concern the one slide member 51B-1 which is driven by the driving body.

In FIG. 10A, the driving casing 56, in which the electric motor 54 with a reduction gear serving as the driving body and subject to inverter control is installed, is mounted on the apparatus housing 11 (see FIG. 2A). A sprocket 53B is fitted to the reduction gear portion of that motor 54 with the reduction gear. The box-shaped drive casing 56 having a substantially rectangular parallelepiped outer shape elongated in the moving direction of the aforementioned slide member 51B-1 (FIGS. 10A and 10B) has a substantially closed box shape, but a window portion 56A is formed in a side wall portion where the coupling member 51A is passed. On the upper end side of the above-described drive casing 56, an upper sprocket 53A is supported by a support leg 56D rising from a bottom wall 56C.

The rail body 52B-1 of a rectangular cylindrical shape shorter than the drive casing 56 is provided in the drive casing 56. As shown in FIG. 11, the rail body 52B-1 is positioned substantially in a center of the drive casing 56 in a cross section perpendicular to the longitudinal direction of the drive casing 56, and is mounted on the bottom wall 56C by means of a mounting leg 56E rising from the bottom wall 56C of the drive casing 56, as shown in FIG. 10B.

As shown in FIG. 11, the one slide member 51B-1 has a U-shaped configuration surrounding the rail body 52B-1 from three directions, and has an upper plate portion 51B-1A and a pair of side plate portions 51B-1B each having an overturned U-shape and suspended from the upper plate portion 51B-1A. Both open ends 54A-1 and 54A-2 of two chains 54A wound around and stretched between both sprockets 53A and 53B are connected to the aforementioned upper plate portion 51B-1A (see FIGS. 10A and 10B), and the chain 54A, an upper traveling path formed by the upper plate portion 51B-1A of the slide member 51B-1, and a lower traveling path formed therebelow form a traveling loop of a closed chain in combination. As shown in FIGS. 10B and 11, bearings 58A rolling on the upper and lower surfaces of the rail body 52B-1 and rollers 58B rolling on side surfaces of the rail body 52B-1 are mounted on the lower traveling path. In FIG. 11, cross sections at a position S1 corresponding to the bearing 58A and a position S2 corresponding to the roller 58B in FIG. 10A are shown as one cross section to facilitate the understanding. A shaft 57-1 is mounted on the aforementioned side plate portion 51B-1B, and the bearing 58A is supported by that shaft 57-1, so that the upper and lower bearings 58A are adapted to roll on the upper and lower surfaces of the rail body 52B-1, respectively. Meanwhile, a vertical shaft 58-1 for rotatably supporting each roller 58B is fixed to a vertical pair of support plates 51B-C, so that the rollers 58B are adapted to roll on the side surface of the rail body 52B-1. Thus, the slide member 51B-1 moves smoothly by being positioned by the bearings 58A in the vertical direction and by the rollers 58B in the horizontal direction with respect to the rail body 52B-1.

One end of the coupling member 51A is coupled to the side plate portion 51B-1B of the above-described one slide member 51B-1, while the other end of the coupling member 51A is coupled to the other slide member 51B-2 (see FIG.

12A). The pair of stick latching arm bodies 51 respectively extend from positions in the vicinities of both end portions of the above-described coupling member 51A in the forward direction, i.e., the upwardly moving direction of the stick latching arm bodies 51, and the discharge hook portion 52 is rotatably attached to each of their front end portions (see FIG. 10C).

Unlike the already described one slide member 51B-1, the other slide member 51B-2, to which the other end of the coupling member 51A is coupled, is not driven by a motor and chains, but moves together with the coupling member 51A coupled to the slide member 51B-1. In other words, the other slide member 51B-2 is driven by the above-described one slide member 51B-1. As shown in FIG. 9B, as for this other slide member 51B-2, the box-shaped driven casing 57 having a substantially rectangular parallelepiped outer shape and extending in the moving direction of the slide member 51B-2 is mounted on the apparatus housing 11, and the rail body 52B-2 having an overturned U-shape is mounted on the inner side wall of the driven casing 57. Meanwhile, the coupling member 51A is entered into the interior of the driven casing 57 through an opening in the right-hand side wall of the driven casing 57 shown in FIG. 12A, and its end portion is entered into the interior of the aforementioned rail body 52B-2 having the overturned U-shape so as to be supported by a roller 59 mounted on the slide member 51B-2. Thus, the roller 59 rollingly travels through the rail body 52B-2 while being restrictedly guided in the vertical direction by the upper and lower plate portions of the rail body 52B-2.

As described above, the structure provided is such that the one rail body 52B-1 has a rectangular cylindrical shape and the bearings 58A rolling on the upper and lower surfaces of the one rail body 52B-1 as well as the rollers 58B rolling on the side surfaces of the one rail body 58B-1 are mounted on one slide member 51B-1; therefore, through the cooperative action of the rail body 52B-2, i.e., the other rail body, it is possible to minimize the creaking of the one slide member 51B-1 with respect to the one rail body 52B-1, which can occur when the other slide member 51B-2 fixed to the other end of the elongated coupling member 51A is made to undergo followed movement at high speed. As a result, the one slide member 51B-1 is able to move the other slide member 51B-2 at high speed. Here, the shape of the other rail body 52B-2 is not limited to the overturned U-shape insofar as the other rail body 52B-2 has such a structure as to be capable of restrictedly guiding the other rail body 51B-2.

In the apparatus of this embodiment, since the other moving body is driven by the one moving body, a special means for achieving the synchronization of the two moving bodies is not necessary.

Further, in this embodiment in which the electric motor 54 is adopted as the driving body, since the electric motor 54 is capable of driving the one slide member 51B-1 at high speed in a state of being positionally controlled with high precision, the other slide member 51B-2 can be moved at high speed with high precision by the one slide member 51B-1.

Next, with reference to FIGS. 13 to 15C, a description will be given of another embodiment of the present invention concerning the sausage suspending apparatus. This other embodiment (hereinafter, the second embodiment) has large differences with the former embodiment in that while the stick supplying unit 40 in accordance with the former embodiment shown in FIGS. 3A to 4C moves horizontally to supply the sticks to the stick supporting members, in the second embodiment, a stick supplying unit 80 is raised and lowered to supply the stick to the stick supporting members, and in that a carrying-out conveyor unit and a stick receiving unit for transferring the sticks to the carrying-out conveyor unit are not provided. Namely, in the second embodiment, the stick supplying unit 80, the stick supporting unit 30, and the stick discharging unit 50 are not configured to be disposed above the carrying-out conveyor unit.

In the stick supporting unit 30 in accordance with the second embodiment, the stick rear portion supporting member base 32B-1 is disposed at a position above the stick supplying unit 80 by being fixed to the apparatus housing 11. The endless circulating body 32B-2, on which the stick rear portion supporting members 32B are mounted and which circulatingly moves, is provided on the stick rear portion supporting member base 32B-1. The stick rear portion supporting member 32B operates in the same way as in the former embodiment, and supports the stick T and releases the support of the stick T. The stick front portion supporting member 32A is provided on the apparatus body 11, and, at the time of the discharging of the stick T, the stick front portion supporting member 32A and the stick rear portion supporting members 32B in this second embodiment are adapted to receive abutment from below of the stick T being moved upwardly, and rotate upwardly (see FIG. 15C).

As shown in FIGS. 13 to 15C and particularly in FIG. 15A, the stick supplying unit 80 of this second embodiment includes a pair of stick feeding-out bodies 81 which are respectively located below the stick supporting members 32 and feed the plurality of sticks T forwardly while arranging them; a pair of stick positioning members 82 which, upon receiving the stick T from the pair of stick feeding-out bodies 81, separate a leading stick T from the ensuing sticks T and retain it temporarily at a fixed position; a pair of stick taking-out portions 83 for taking out the stick T from the pair of stick positioning members 82 and bringing it to a stick supporting position of the stick supporting members 32; a stick feed conveyor frame 84; and a stick feed conveyor housing 85. The stick feed conveyor housing 85 is installed on the installation floor surface FL. The pair of stick feeding-out bodies 81 and the pair of stick positioning members 82 are provided on the stick feed conveyor frame 84. The stick feed conveyor frame 84 is mounted on the stick feed conveyor housing 85 such that each stick positioning member 82 is arranged at a position where it is aligned with the stick taking-out portion 83 of the stick latching arm body 51 lowered to the lowermost position. The stick taking-out portion 83 is formed in the stick latching arm body 51 of the stick discharging unit 50 in the already described former embodiment. Namely, in this second embodiment, the stick latching arm body 51 constitutes a part of the stick discharging unit 50 and also constitutes a part of the stick supplying unit 80. Thus, the above-described stick discharging unit 50 and the above-described stick supplying unit 80 in accordance with the second embodiment constitute a stick discharging and supplying unit in accordance with a fourth aspect of the invention.

Figure 14:
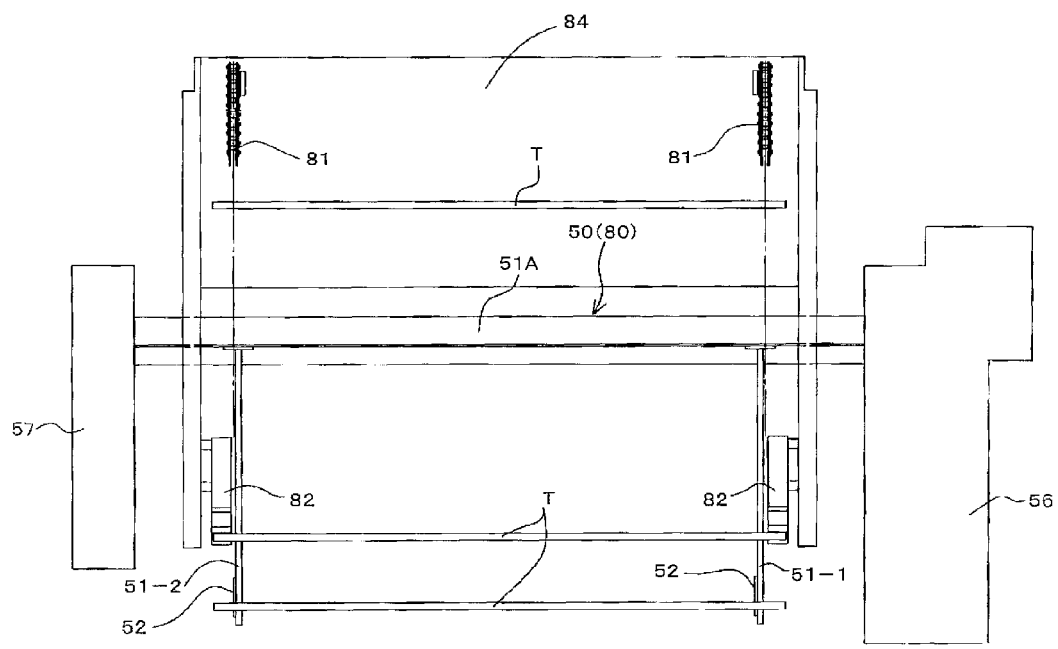
FIG. 14 is a plan view of the apparatus shown in FIG. 13.

As shown in FIG. 14, the pair of stick feeding-out bodies 81 are formed as a pair of chains for supporting both end portions of the stick T and feeding the plurality of sticks T forwardly from the rear, and the range of an upper linearly moving portion shown in FIG. 15A is set as a stick feeding-out range. The stick positioning member 82 is disposed at a front end portion of this stick feeding-out body 81. As shown in FIG. 15B, as for the stick positioning member 82, two V-shaped groove portions 82A and 82B are formed adjacent to each other following an inclined portion oriented toward the front end, and the groove portion 82A on the front end side is located at a lower position than the groove portion 82B in the rear. In the groove portion 82A on the front end side, a leading stick T is positioned in such a manner as to be spaced apart from an ensuing stick T.

As already described, the stick taking-out portion 83 is formed on the stick latching arm body 51 (51-1, 51-2) of the stick discharging unit 50. In the stick latching arm body 51, the stick latching portion 51a shaped in the form of a notched portion is formed at the upper end position of the stick latching arm body 51 for discharging the stick, and, in addition, the stick taking-out portion 83 serving as a second stick latching portion shaped in the form of a notched portion is also formed at an upper edge positioned therebelow. The stick latching arm body 51 effects rising and lowering movement in its longitudinal direction, and, during rising, its stick latching portion 51a passes the stick supporting position on the stick front portion supporting member 32A and the stick rear portion supporting members 32B and effects stick discharging from the stick supporting members 32. Further, during rising, the stick taking-out portion 83 passes the position of the groove portion 82A of the stick positioning member 82, and the stick T is taken out from the groove portion 82 of that stick positioning member 82 by the stick taking-out portion 83. During lowering, the stick taking-out portion 83 passes the stick T supporting position on the stick supporting member 32, and delivers and supplies the stick T onto the stick supporting member 32.

In the same way as in the former embodiment, the drive casing 56 and the driven casing 57 of the stick discharging unit 50 are fixed to the apparatus housing 11 so that they are respectively located outside the range between both end portions in the longitudinal direction of the stick T being supported by the stick supporting members 32. Since such a configuration is provided, the respective upper end portions of the drive casing 56 and the driven casing 57 can be disposed at a higher position than the stick supporting members 32, thereby making it possible to make low the height of the stick supporting members 32 from the installation floor surface FL in the second embodiment as well. Similarly, since the height of the stick feeding-out body 81 can also be made low, the operation of replenishing the sticks T to the stick feeding-out body 81 by the operator P can be facilitated.

A detailed description will be given hereinunder of such supplying and discharging of the stick T in connection with the stick supporting members 32.

When distal ends of the above-described stick front portion supporting member 32A and stick rear portion supporting members 32B in their horizontal posture shown in FIGS. 15A and 15C are pressed from below by the stick T being supported by the stick latching arm bodies 51 being moved upwardly, the stick front portion supporting member 32A and the stick rear portion supporting members 32B are rotated upwardly to allow the passage of the stick T, and, after the passage of the stick T, the stick front portion supporting member 32A and the stick rear portion supporting members 32B are adapted to return to the aforementioned horizontal posture by their own self weight.

In such a configuration, the stick feeding-out body 81 first feeds out the plurality of sticks T forwardly, and causes a leading stick T and an ensuing stick T to slip down onto the groove portions 82A and 82B, respectively, of the stick positioning member 82.

Next, when each stick latching arm body 51 is moved upwardly, the stick taking-out portion 83 takes up the stick T in the groove portion 82A of the aforementioned stick positioning member 82 at the time of passing the position of the groove portion 82A, and the stick latching arm body 51 further continues to move upwardly with the stick T supported by the stick taking-out portion 83.

Each stick latching arm body 51 moves upwardly, takes up the stick T on the stick supporting member 32 by the above-described stick latching portion 51a, and reaches the uppermost position, at that point of which the stick T is discharged by the rotation of the discharge hook member 52 in the already described procedure. The movement of the stick latching arm body 51 to the uppermost position is made possible as the above-described stick front portion supporting member 32A and stick rear portion supporting members 32B are pressed from below by the stick T on the stick taking-out portions 83 and thereby rotate upwardly. After the passage of the stick T, the stick front portion supporting member 32A and the stick rear portion supporting members 32B downwardly rotate and return to their horizontal position.

Next, each stick latching arm body 51 is moved downwardly, and, at the time of passing the position of the stick front portion supporting member 32A and the stick rear portion supporting members 32B, delivers the stick T on both stick taking-out portions 83 onto the stick front portion supporting member 32A and the stick rear portion supporting members 32B. Each stick latching arm body 51 is moved further downwardly to return to the lowermost position, and prepares for the supply and discharge of the ensuing stick T.

The stick discharging unit in accordance with the present invention is able to adopt various embodiments for synchronizing the movement of the one stick latching arm body and the movement of the other stick latching arm body. In stick discharging units 90, 100, and 200 which will be described below with reference to FIGS. 16A to 19B, the stick latching arm bodies are positioned at both end portions of the stick in the longitudinal direction of the stick, and the moving bodies and the driving body for upwardly moving the stick latching arm bodies are provided outside the range between both end portions of the stick in the longitudinal direction of the stick being latched by the stick latching arm bodies. As a result, the stick discharging units 90, 100, and 200 exhibit the effects based on their configuration, as has been explained with respect to the stick discharging unit 50.

Although the above-described stick discharging unit 50 is configured such that the other slide member 51B-2 is driven by the one slide member 51B-1 through the coupling member 51A, the stick discharging unit 90, which will be described next, is configured such that the other slide member 51B-3 is driven by the one slide member 51B-1 in cooperation with the coupling member 51A by using a rotational shaft member 91 coupling both slide members 51B-1 and 51B-3, as shown in FIGS. 16A to 17B.

This stick discharging unit 90 has the drive housing 56 and the driven housing 57, and the same component elements as those inside the drive housing 56 of the stick discharging unit 50 are arranged inside the drive housing 56 of the stick discharging unit 90 (see FIGS. 10A to 11). The other slide member 51B-3 and the other rail body 52B-3 are arranged inside the driven housing 57.

In this stick discharging unit 90, one rack member 93 meshing with a pinion member 92 attached to one end portion of the rotational shaft member 91 disposed horizontally in such a manner as to extend between the drive housing 56 and the driven housing 57 is fixed to the upper plate portion 51B-1A of the one slide member 51B-1, while another rack member 95 meshing with a pinion member 92 attached to the other end portion of the rotational shaft member 91 is fixed to the other slide member 51B-3.

It should be noted that, instead of fixing the one rack member 93 and the other rack member 95 to the one slide member 51B-1 and the other slide member 51B-3, the one rack member 93 and the other rack member 95 may be fixed to the coupling member 51A located between the one slide member 51B-1 and the one stick latching arm body 51-1 and to the coupling member 51A located between the other slide member 51B-3 and the other stick latching arm body 51-2, respectively, in such a manner as to be parallel with each other and to be spaced away from the respective slide members 51B. In this configuration, the rotational shaft member 91 is coupled to the one and the other slide members 51B-1 and 51B-3 through the coupling member 51A.

The rotational shaft member 91 connects together one rack-and-pinion mechanism 94 constituted by the pinion member 92 and the one rack member 93 and another rack-and-pinion mechanism 96 constituted by the pinion member 92 and the other rack member 95. A pair of bearings 97 for supporting the rotational shaft member 91 are each mounted on the apparatus housing 11 through a bracket so as to dispose the rotational shaft member 91 at a predetermined position. When the one slide member 51B-1 is moved upwardly, the amount of upward movement of the one slide member 51B-1 converted to rotary motion by the above-described one rack-and-pinion mechanism 94 is transmitted to the other slide member 51B-3 by both the rotational shaft member 91 rotating together with the one pinion member 92 and the other rack-and-pinion mechanism 96, thereby causing the other slide member 51B-3 to move upwardly in the direction of arrow C in synchronism with the one slide member 51B-1. When the one rack member 93 and the other rack member 95 reach an uppermost movement end, as shown in FIG. 16A, the motor 54 is reversely rotated to cause the other rack member 95 to move downwardly in synchronism with the one rack member 93.

Figures 16A, 16B:
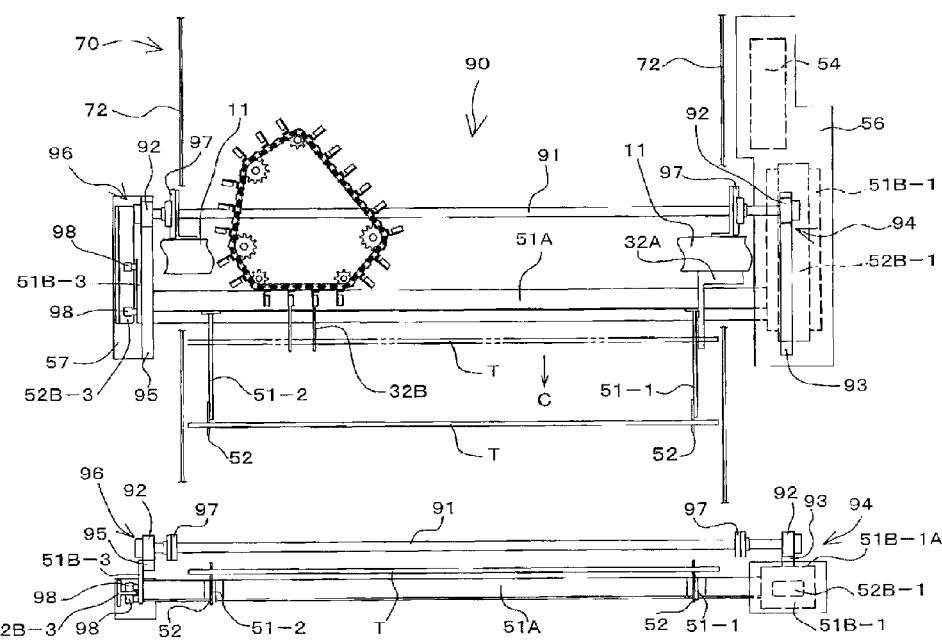
Figure 17B:
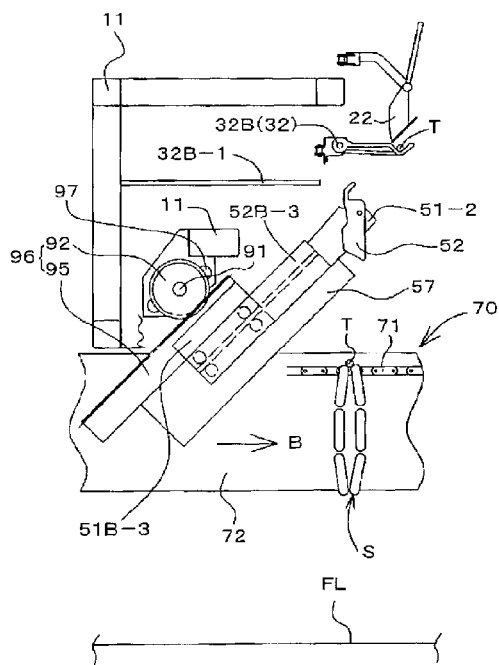
Figure 17A:
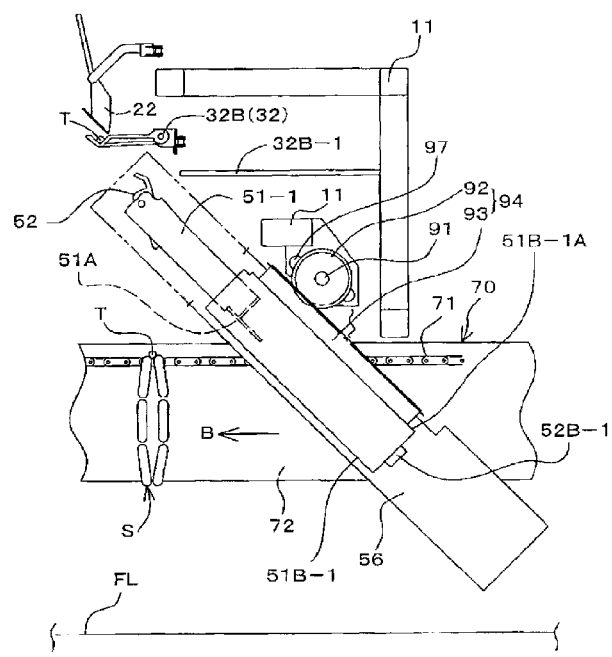

A pair of rollers 98 for vertically sandwiching the other rail body 52B-3 having a T-shaped cross section and shown in FIG. 16B are mounted at two locations on the other slide member 51B-3. The position of the other slide member 51B-3 is arranged to be determined by the rollers 98 in the vertical direction and by the rotational shaft member 91 in the back-and-forth direction (direction of arrow C and its opposite direction). The rollers 98 roll on the other rail body 52B-3 in the upward movement of the other slide member 51B-3. Thus, the upward movement and downward movement of the other slide member 51B-3 are slidably guided by the other rail body 52B-3 through the rollers 98.

In the stick discharging unit 90 as well, in the same way as the stick discharging unit 50, the other slide member 51B-3 is arranged to be driven by the one slide member 51B-1 through the coupling member 51A. In addition, in the stick discharging unit 90, since the other slide member 51B-3 is made to be driven by the one slide member 51B-1 also through the rotational shaft member 91 connected to the pair of rack-and-pinion mechanisms 94 and 96, at the time of discharging even the stick T with a heavy sausage suspended therefrom, the other slide member 51B-3 can be reliably made to follow the movement of the one slide member 51B-1.

Since the above-described stick discharging unit 90 is provided with the rotational shaft member 91, the other slide member 51B-3 can be made to follow the movement of the one slide member 51B-1 only through the rotational shaft member 91 without using the coupling member 51A in accordance with the stick discharging speed and the weight of the sausage loaded on the stick. In this configuration, instead of the coupling member 51A, the one coupling member 51C-1 and the other coupling member 51C-2 which are used in the below-described stick discharging unit 100 are fixed to the one slide member 51B-1 and the other slide member 51B-3, respectively.

Here, instead of using the above-described other slide member 51B-3 and rail body 52B-3 of the stick discharging unit 90, the other slide member and rail body of this stick discharging unit 90 can be configured by using the slide member 51B-1, the rail body 52B-1, the bearings 58A, and the rollers 58B which are the same as those of the stick discharging unit 50. It goes without saying that in the case where the slide member 51B-1 is used as the other slide member of the stick discharging unit 90, the slide member 51B-1 is not driven by the chains 54A.

The stick discharging unit 50 and the stick discharging unit 90 described above are so configured that the other slide members 51B-2 and 51B-3 are each driven by the one slide member 51B-1; however, as shown in FIGS. 18A and 18B, the stick discharging unit 100 which will be described next is so configured that the one slide member 51B-1 and the other slide member 51B-4 are separately driven by one electric motor 54-1 and another electric motor 54-2, respectively.

This stick discharging unit 100 has one drive housing 56-1 and another drive housing 56-2, and the same component elements as those inside the drive housing 56 of the stick discharging unit 50 are arranged inside the one drive housing 56-1 and the other drive housing 56-2 (see FIGS. 10A to 11). The other drive housing 56-2, as well as the other slide member 51B-4, another rail body 52B-4, and the other motor 54-2, which are illustrated and are parts of the component elements provided therein, are arranged bilaterally symmetrically with respect to the one drive housing 56-1 and its internal component elements in the longitudinal direction of the stick T supported by the stick supporting members 32A and 32B.

The one stick latching arm body 51-1 is fixed to one coupling member 51C-1 connected to the one slide member 51B-1, while the other stick latching arm body 51-2 is fixed to another coupling member 51C-2 connected to the other slide member 51B-4.

Reference numeral 101 denotes a motor controller for allowing the two motors 54-1 and 54-2 to be subjected to control for synchronizing the rotational speeds and positions of both of the one motor 54-1 and the other motor 54-2 so that the one stick latching arm body 51-1 and the other stick latching arm body 51-2 synchronously effect upward movement and downward movement. It should be noted that FIG. 18A shows a state in which the one stick latching arm body 51-1 and the other stick latching arm body 51-2 have completed upward movement in the direction of arrow C. As the one motor 54-1 and the other motor 54-2 serving as driving bodies, it is possible to adopt electric motors including electric servo motors and inverter motors. Alternatively, instead of these electric motors, air cylinders or electric cylinders which are subjected to synchronization control may be used.

With the above-described stick discharging unit 100, since the movement of the one stick latching arm body 51-1 and the other stick latching arm body 51-2 is synchronized by such electrical control, it is unnecessary to provide members for making the other slide member 51B-2 or 51B-4, which is provided in the stick discharging unit 50 or the stick discharging unit 90, to be driven by the one slide member 51B-1. Hence, attainment of high speed in the stick discharging operation is made possible by virtue of the light weight through the reduction of these members.

The driving body in the already described embodiments is not particularly limited insofar as it is an element capable driving the moving body. For instance, the driving body can be configured by using a known electric motor of various types (e.g., servo motor) including a motor with a reduction gear, an air cylinder, or an electric cylinder in accordance with the desired movement cycle of the stick and the weight of the sausage loaded on the stick.

Figure 19A:
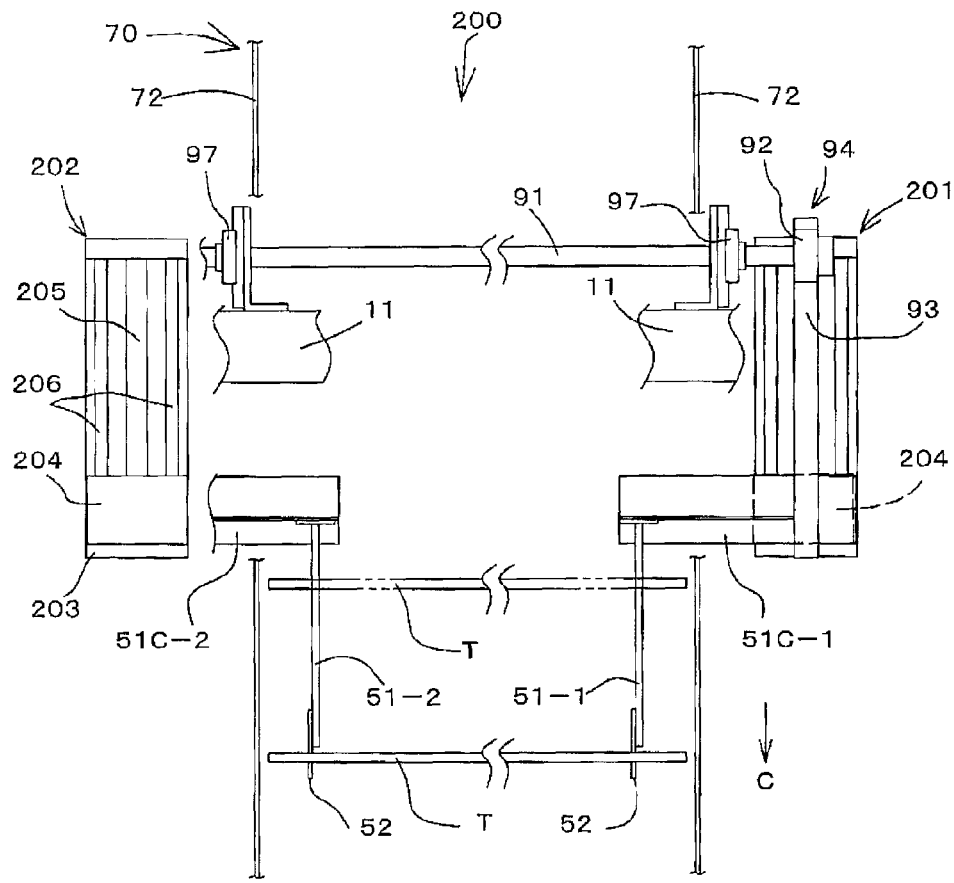
Figure 19B:
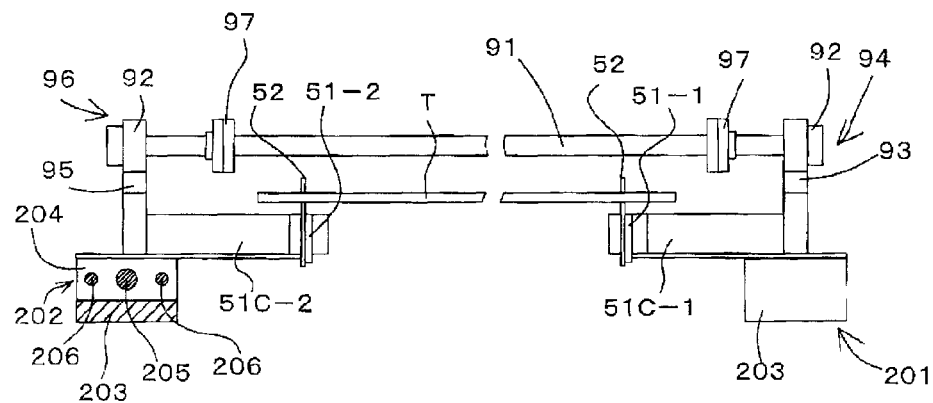

In the stick discharging unit 200 shown in FIGS. 19A and 19B, the one and the other driving body and moving body are configured by a pair of rodless air cylinder sets 201 and 202, and the pair of rodless air cylinder sets 201 and 202 are connected by the rotational shaft member 91 used in the stick discharging unit 90 so as to achieve synchronization between the one rodless air cylinder set 201 and the other rodless air cylinder set 202.

The stick discharging unit 200 includes the one cylinder set 201 and the other cylinder set 202; the rotational shaft member 91; the one rack-and-pinion mechanism 94 constituted by the pinion member 92 and the rack member 93 and the other rack-and-pinion mechanism 96 constituted by the pinion member 92 and the rack member 95; the pair of bearings 97 fixed to the apparatus housing 11 to support the rotational shaft member 91; and the one coupling member 51C-1 to which the one stick latching arm body 51-1 is fixed and the other coupling member 51C-2 to which the other stick latching arm body 51-2 is fixed.

The one rodless air cylinder set 201 and the other rodless air cylinder set 202 are configured by commercially available identical products. Hereafter, a description will be given of the other cylinder set 202. The other cylinder set 202 has a base member 203, a moving body 204, a driving body 205, and a rail body 206. FIG. 19B shows the configuration of the other cylinder set 202 by omitting portions of the base member 203. The moving body 204 is adapted to be slidably guided by a rail pair 206 constituted by two rod-like members and mounted on the base member 203. The driving body 205 is constituted by a rodless cylinder component having a cylinder member and a piston which reciprocates inside the cylinder member, and the driving body 205 drives the moving body 204 so that the moving body 204 fitted to an outer periphery of the cylinder member moves upwardly.

The one coupling member 51C-1 is connected to the moving body 204 of the one cylinder set 201, and the other coupling member 51C-2 is connected to the moving body 204 of the other cylinder set 202. The one rack member 93 is fixed to the one moving body 204 through the one coupling member 51C-1, and the other rack member 95 is fixed to the other moving body 204 through the other coupling member 51C-2.

The rotational speeds of both the one pinion member 92 and the other pinion member 92 are restricted to the same rotational speed by the rotational shaft member 91 connected at its both end portions to both pinion members 92. As a result, a difference in moving speed is not generated between the one moving body 204 and the other moving body 204, so that the one stick latching arm body 51-1 and the other stick latching arm body 51-2 are adapted to synchronously move upwardly in the direction of arrow C. It should be noted that FIG. 19A shows a state in which the upward movement in the direction of arrow C is completed. When the stick T is discharged from the one stick latching arm body 51-1 and the other stick latching arm body 51-2, the respective driving bodies 205 of the one cylinder set 201 and the other cylinder set 202 move the respective moving bodies 204 downwardly.

The above-described stick discharging unit 200 becomes a simple and inexpensive unit since the one moving body 204 and the other moving body 204, which are pneumatically driven separately, are connected by a mechanical synchronization mechanism to attain synchronous movement of the two bodies.

What is claimed is:

1. A stick discharging unit for use in a sausage suspending apparatus, the stick discharging unit being adapted to discharge a stick from stick supporting members provided in the sausage suspending apparatus including a plurality of suspending members for suspending a sausage, a conveyor having the suspending members and adapted to move the suspending members, and the stick supporting members for supporting the stick for receiving the sausage from the suspending members, said stick discharging unit comprising a pair of stick latching arm bodies each having a stick latching portion formed thereon and adapted to move upwardly in a forward direction, wherein said stick discharging unit is adapted to discharge the stick from the stick latching portion after each of the pair of stick latching arm bodies, during its upward movement, has taken up the stick by the stick latching portion and moved upward, and wherein the pair of stick latching arm bodies of said stick discharging unit are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies.

2. A sausage suspending apparatus comprising: the suspending members, the conveyor, the stick supporting members, and the stick discharging unit according to claim 1.

3. A stick discharging unit for use in a sausage suspending apparatus, the stick discharging unit being adapted to discharge a stick from stick supporting members provided in the sausage suspending apparatus including a plurality of suspending members for suspending a sausage, a conveyor having the suspending members and adapted to move the suspending members, the stick supporting members for supporting the stick for receiving the sausage from the suspending members, a stick receiving unit for receiving the stick discharged from the stick supporting members and moving the stick downwardly, and a carrying-out conveyor unit for conveying out sticks while receiving the delivery of the sticks from the stick receiving unit, said stick discharging unit comprising a pair of stick latching arm bodies each having a stick latching portion formed thereon and adapted to move upwardly in a forward direction, and after each of the pair of stick latching arm bodies, during its upward movement, has taken up the stick by the stick latching portion and moved upward, said stick discharging unit is adapted to discharge the stick from the stick latching portion and deliver the stick to the stick receiving unit having a stick receiving and lowering member, wherein the pair of stick latching arm bodies of said stick discharging unit are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies, and wherein the pair of stick latching arm bodies are located above the carrying-out conveyor unit, and the moving body and the driving body are located outside a range of the carrying-out conveyor unit in the longitudinal direction of the stick being latched by the pair of stick latching arm bodies.

4. A sausage suspending apparatus comprising: the suspending members, the conveyor, the stick supporting members, the stick receiving unit, the carrying-out conveyor unit, and the stick discharging unit according to claim 3.

5. A stick supplying unit for use in a sausage suspending apparatus, the stick supplying unit being adapted to supply a stick onto stick supporting members provided in a sausage suspending apparatus including a plurality of suspending members for suspending a sausage, a conveyor having the suspending members and adapted to move the suspending members, and the stick supporting members for supporting the stick for receiving the sausage from the suspending members, said stick supplying unit comprising a pair of stick moving and supplying bodies which receive the stick from a stick storage device which drops and discharges the sticks one by one from a stick discharge port at a lower portion thereof, move forwardly in a perpendicular direction to a longitudinal direction of the stick, bring the stick to a predetermined advanced position immediately above the stick supporting members, and causes the stick to drop onto the stick supporting members, wherein each of the pair of stick moving and supplying bodies has a forward moving body which moves forwardly, a guide body which is provided on the forward moving body and in which a vertically penetrating stick receiving groove is formed so as to receive an end portion of the stick from above and allow the downward passage of the stick therethrough, and stick hampering members respectively disposed at a plurality of vertical positions to hamper the dropping of the stick inside the stick receiving groove at an advanced position in the stick receiving groove into which the stick hampering members have entered, and wherein, during the forward movement of the stick moving and supplying body toward the predetermined advanced position, the stick hampering members starting with an uppermost one thereof sequentially retreat from the stick receiving groove, and the stick is allowed to drop onto the stick supporting members at the predetermined advanced position upon completion of the retreat of a lowermost one of the stick hampering members from the stick receiving groove.

6. A sausage suspending apparatus comprising: the suspending members, the conveyor, the stick supporting members, and the stick supplying unit according to claim 5.

7. A sausage suspending apparatus comprising:
a plurality of suspending members for suspending a sausage;
a conveyor having the suspending members and adapted to move the suspending members;
stick supporting members for supporting the stick for receiving the sausage from the suspending members; and
a stick discharging and supplying unit for supplying the stick onto the stick supporting members and discharging the stick from the stick supporting members, wherein said stick discharging and supplying unit has a pair of stick latching arm bodies each of which has a stick latching portion and a second stick latching portion formed thereon and is adapted to move upwardly in a forward direction, and, after the stick latching arm body, during its upward movement, has taken up the stick from the stick supporting members by the stick latching portion and moved upwardly, the stick latching arm body discharges the stick from the stick latching portion, whereupon the stick latching arm body, during its downward movement, delivers the stick latched on the second stick latching portion onto the stick supporting members, and wherein the pair of stick latching arm bodies are respectively located in correspondence with both end portions of the stick in a longitudinal direction of the stick, and a moving body for upwardly moving the pair of latching arm bodies and a driving body for driving the moving body are provided outside a range between the both end portions of the stick in the longitudinal direction of the stick being latched by the pair of stick latching arm bodies.

8. A sausage suspending apparatus comprising: a conveyor having a plurality of suspending members for suspending a sausage and adapted to move the suspending members; stick supporting members for supporting a stick for receiving the sausage from the suspending members; a stick discharging unit for discharging the stick from the stick supporting members; and a stick supplying unit for supplying the stick onto the stick supporting members, wherein the stick supplying unit has a stick moving and supplying body which has a receiving port for receiving the stick dropped and supplied thereinto from above, moves forwardly in a substantially horizontal plane in a perpendicular direction to a longitudinal direction of the stick, brings the stick received from the receiving port to a predetermined advanced position immediately above the stick supporting members, and drops the stick onto the stick supporting members, and wherein the stick discharging unit has a stick latching arm body having a stick latching portion thereon and adapted to move upwardly in a forward direction, and after the stick latching arm body, during its upward movement, has taken up the stick from the stick supporting members by the stick latching portion and moved upwardly, the stick latching arm body discharges the stick from the stick latching portion, the stick being adapted to move between the stick supporting member and the suspending member located above the stick supporting member during the forward movement of the stick moving and supplying body, the receiving port of the stick moving and supplying body being adapted to receive the stick at a predetermined retreated position on an inner side of a circulating passage in the substantially horizontal plane of the conveyor.

9. A sausage suspending apparatus comprising: a conveyor having a plurality of suspending members for suspending a sausage and adapted to move the suspending members; stick supporting members for supporting a stick for receiving the sausage from the suspending member; a stick discharging unit for discharging the stick from the stick supporting members; a stick receiving unit for receiving the stick discharged from the stick supporting members by the stick discharging unit, and a carrying-out conveyor unit for conveying out sticks while receiving the delivery of the sticks from the stick receiving unit, wherein a first rotational axis and a second rotational axis which form a linearly moving range of a wrapping connector moving body of the conveyor are provided with an interaxial distance longer than an overall length of the stick, wherein the carrying-out conveyor unit has an endless traveling body provided at a location of a predetermined distance from the first rotational axis between the first rotational axis and the second rotational axis in a direction of the linearly moving range of the wrapping connector moving body, and wherein the endlessly traveling body is provided at a position immediately below the wrapping connector moving body so as to travel perpendicularly to a longitudinal direction of the stick while placing thereon both end portions of the sticks delivered from the stick receiving unit provided at a position immediately above the endlessly traveling body.

* * * * *